US008744686B2

(12) United States Patent
Yokota

(10) Patent No.: US 8,744,686 B2
(45) Date of Patent: Jun. 3, 2014

(54) DEVICE FOR ESTIMATING TURNING CHARACTERISTIC OF VEHICLE

(75) Inventor: Takahiro Yokota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 150 days.

(21) Appl. No.: 13/389,696

(22) PCT Filed: Sep. 24, 2009

(86) PCT No.: PCT/JP2009/067128
§ 371 (c)(1),
(2), (4) Date: Feb. 9, 2012

(87) PCT Pub. No.: WO2011/036821
PCT Pub. Date: Mar. 31, 2011

(65) Prior Publication Data
US 2012/0173039 A1 Jul. 5, 2012

(51) Int. Cl.
A01B 69/00 (2006.01)
B62D 6/00 (2006.01)
B62D 11/00 (2006.01)
B62D 12/00 (2006.01)
B63G 8/20 (2006.01)
B63H 25/04 (2006.01)
G05D 1/00 (2006.01)
G06F 7/00 (2006.01)
G06F 17/00 (2006.01)

(52) U.S. Cl.
USPC ................................. 701/42; 701/1; 701/70

(58) Field of Classification Search
USPC ........................ 701/41, 42, 43, 44
See application file for complete search history.

(56) References Cited

U.S. PATENT DOCUMENTS

| 4,706,979 | A | * | 11/1987 | Kawabe et al. ............... 180/414 |
| 5,483,446 | A | * | 1/1996 | Momose et al. ................ 701/1 |
| 5,627,756 | A | | 5/1997 | Fukada et al. |
| 7,031,808 | B2 | | 4/2006 | Tanimoto et al. |
| 2004/0002795 | A1 | * | 1/2004 | Tanimoto et al. ................ 701/1 |
| 2006/0169522 | A1 | | 8/2006 | Katayama |
| 2011/0257876 | A1 | * | 10/2011 | Yokota ......................... 701/124 |

FOREIGN PATENT DOCUMENTS

| EP | 1 375 281 A1 | 1/2004 |
| JP | A-10-258720 | 9/1998 |
| JP | A-2000-95085 | 4/2000 |
| JP | A-2004-26073 | 1/2004 |
| JP | A-2004-26074 | 1/2004 |

(Continued)

OTHER PUBLICATIONS

JP 2009-274507 machine translation.*

(Continued)

Primary Examiner — Fadey Jabr
Assistant Examiner — Lail Kleinman
(74) Attorney, Agent, or Firm — Oliff PLC

(57) ABSTRACT

The device calculates a transient yaw rate of the vehicle on the basis of a standard yaw rate of the vehicle using an estimated value of a time constant coefficient of steering response, and adjusts the estimated value of a time constant coefficient of steering response on the basis of the relationship between a transient yaw rate of the vehicle and an actual yaw rate of the vehicle so that a transient yaw rate of the vehicle approaches an actual yaw rate of the vehicle.

12 Claims, 18 Drawing Sheets

(56) References Cited

FOREIGN PATENT DOCUMENTS

| JP | A-2005-8067 | 1/2005 |
| JP | A-2006-27388 | 2/2006 |
| JP | A-2006-168630 | 6/2006 |
| JP | A-2009-119921 | 6/2009 |
| JP | A-2009-137512 | 6/2009 |
| JP | 2009274507 A * | 11/2009 |
| JP | A-2009-274507 | 11/2009 |

OTHER PUBLICATIONS

International Search Report issued in international Patent Application No. PCT/JP2009/067128 dated Jan. 19, 2010 (with translation).

* cited by examiner

DEVICE FOR ESTIMATING TURNING CHARACTERISTIC OF VEHICLE

TECHNICAL FIELD

The present invention relates to a device for estimating the turning characteristic of a vehicle and, more particularly, to a device for a vehicle which estimates a time constant coefficient of steering response which represents the turning characteristic of a vehicle on the basis of a standard yaw rate of the vehicle and a transient yaw rate of the vehicle when the vehicle turns.

BACKGROUND ART

Assume that an actual yaw rate of a vehicle has a relationship of first order delay to a standard yaw rate of the vehicle and a coefficient multiplied to a vehicle speed in a time constant of the first order delay is referred to a time constant coefficient of steering response. A stability factor of the vehicle and a time constant coefficient of steering response t represent a turning characteristic of the vehicle. A stability factor of the vehicle and a a steering-response-time constant coefficient can be estimated by using ARX (auto-regressive exogenous model) to estimate parameters a and b of a discrete-time transfer function from a standard yaw rate of the vehicle to an actual yaw rate of a vehicle.

In, for example, Japanese Patent Application Laid-Open (kokai) No. 2004-26073, a turning characteristic estimating device for a vehicle is described which estimates a standard yaw rate of a vehicle on the basis of running data when the vehicle turns; estimates parameters a and b of a discrete-time transfer function from a standard yaw rate of the vehicle to an actual yaw rate of a vehicle; estimates a time constant coefficient of steering response on the basis of the parameter a; and estimates a stability factor of the vehicle on the basis of the parameters a and b.

In conventional turning characteristic estimating devices for vehicle such as that described in the above-mentioned laid-open publication, a lot of data of standard yaw rates and actual yaw rates are required to estimate the parameters a and b. For this reason, there is a problem that it takes a long time to estimate a stability factor of the vehicle and a time constant coefficient of steering response.

DISCLOSURE OF THE INVENTION

In view of such a problem as described above in conventional turning characteristic estimating devices, it is a primary object of the present invention to estimate a steering-response-time constant coefficient in a shorter time than by conventional devices by means of adjusting estimated values of time constant coefficient of steering response by learning on the basis of a transient yaw rate of a vehicle having a relationship of first order delay to a steady-state standard yaw rate of the vehicle and an actual yaw rate of the vehicle so that a transient yaw rate of the vehicle approaches an actual yaw rate of the vehicle.

The present invention provides a turning characteristic estimation device for a vehicle which regards a transient yaw rate of the vehicle having a relationship of first order delay relative to a standard yaw rate of the vehicle as a value corresponding to an actual yaw rate of the vehicle and estimates a time constant coefficient of steering response which is a coefficient multiplied to a vehicle speed in a time constant of the first order delay, wherein the device calculates a transient yaw rate of the vehicle on the basis of a standard yaw rate of the vehicle using an estimated value of a time constant coefficient of steering response, and adjusts the estimated value of a time constant coefficient of steering response on the basis of the relationship between a transient yaw rate of the vehicle and an actual yaw rate of the vehicle so that a transient yaw rate of the vehicle approaches an actual yaw rate of the vehicle.

According to this configuration, the estimated value of a time constant coefficient of steering response is adjusted so that a transient yaw rate of the vehicle approaches an actual yaw rate of the vehicle, which enables to make the estimated value of a time constant coefficient of steering response to approach a real time constant coefficient of steering response. Therefore, it is not necessary to estimate parameters of a discrete-time transfer function from a standard yaw rate of the vehicle to an actual yaw rate of the vehicle, so that estimation of a time constant coefficient of steering response can be achieved in a shorter time than by conventional devices.

The above-mentioned configuration may be such that: the device adjusts the estimated value of a time constant coefficient of steering response so that a transient yaw rate of the vehicle approaches an actual yaw rate of the vehicle by means of reducing at least one of a difference in magnitude between a transient yaw rate of the vehicle and an actual yaw rate of the vehicle and a difference in phase between a transient yaw rate of the vehicle and an actual yaw rate of the vehicle.

According to this configuration, at least one of a difference in magnitude between a transient yaw rate of the vehicle and an actual yaw rate of the vehicle and a difference in phase between a transient yaw rate of the vehicle and an actual yaw rate of the vehicle is reduced, so that the estimated value of a time constant coefficient of steering response can be adjusted to approach a real time constant coefficient of steering response.

The above-mentioned configuration may be such that: the device calculates three transient yaw rates of the vehicle using a first reference value which is a stored time constant coefficient of steering response, a second reference value which is larger than the first reference value and a third reference value which is smaller than the first reference value, and selects the reference value among the three reference values which corresponds to a minimum value among yaw rate deviation index values which index differences in magnitude between transient yaw rates of the vehicle and an actual yaw rate of the vehicle to set the selected reference value to an estimated time constant coefficient of steering response.

According to this configuration, an estimated time constant coefficient of steering response is set to the reference value among the first to third reference values which corresponds to a minimum yaw rate deviation index value. Therefore, an estimated time constant coefficient of steering response can be set to a value which is nearest to a real time constant coefficient of steering response among the first to third reference values.

The above-mentioned configuration may be such that: the device sets the estimated time constant coefficient of steering response to a renewed first reference value; calculates three transient yaw rates of the vehicle using the renewed first reference value, a renewed second reference value which is larger than the renewed first reference value and a renewed third reference value which is smaller than the renewed first reference value; and selects the reference value among the three renewed reference values which corresponds to a minimum value among yaw rate deviation index values to set the selected reference value to a renewed estimated time constant coefficient of steering response.

According to this configuration, an estimated time constant coefficient of steering response is set to the reference value among the renewed first to third reference values which corresponds to a minimum yaw rate deviation index value. Therefore, an estimated time constant coefficient of steering response can be obtained which is closer to a real time constant coefficient of steering response than an estimated time constant coefficient of steering response selected among the first to third reference values. Accordingly, by means of repeating the procedures of this configuration, an estimated time constant coefficient of steering response can be made closer to a real time constant coefficient of steering response.

The above-mentioned configuration may be such that: the difference between the renewed second reference value and the renewed first reference value is smaller than the difference between the second reference value and the first reference value, and the difference between the renewed third reference value and the renewed first reference value is smaller than the difference between the third reference value and the first reference value.

According to this configuration, an estimated time constant coefficient of steering response can more rapidly approach a real time constant coefficient of steering response than in the case where the difference between the renewed second reference value and the renewed first reference value is not smaller than the difference between the second reference value and the first reference value, and the difference between the renewed third reference value and the renewed first reference value is not smaller than the difference between the third reference value and the first reference value.

The above-mentioned configuration may be such that: the yaw rate deviation index values are calculated on the basis of the magnitude of the difference between an actual yaw rate removed of components equal to or lower than a first prescribed frequency and a transient yaw rates removed of components equal to or lower than a second prescribed frequency.

A transient yaw rate of a vehicle is derived on the basis of state quantities of the vehicle and those state quantities of the vehicle and an actual yaw rate of the vehicle are detected by detecting means. According to the above-described configuration, it is possible to remove steady detection errors such as zero point offsets in detecting means for detecting state quantities of the vehicle and an actual yaw rate of the vehicle, so that the accuracy in estimating an actual yaw rate of the vehicle can be enhanced.

The above-mentioned configuration may be such that: the device varies the first prescribed frequency and/or the second prescribed frequency according to an index value of the number of reciprocating steering operations by a driver per unit time.

Steady detection errors such as zero point offsets in detecting means for detecting such state quantities of the vehicle as an actual yaw rate of the vehicle vary according to the number of reciprocating steering operations by a driver per unit time. According to the above-described configuration, steady detection errors can properly be removed in accordance with the number of reciprocating steering operations by a driver per unit time.

The above-mentioned configuration may be such that: the device varies the first prescribed frequency and/or the second prescribed frequency according to a magnitude of lateral acceleration of the vehicle.

The influence on an accuracy in estimating a time constant coefficient of steering response by steady detection errors such as zero point offsets in detecting means for detecting such state quantities of the vehicle as an actual yaw rate of the vehicle varies according to the magnitude of vehicle speed change, i.e. the magnitude of longitudinal acceleration of a vehicle. According to the above-described configuration, steady detection errors can properly be removed in accordance with the magnitude of longitudinal acceleration of a vehicle.

The above-mentioned configuration may be such that: the yaw rate deviation index values are calculated as values in which the magnitude of the differences between transient yaw rates and an actual yaw rate is transferred to the magnitude of steered angle deviations of the front wheels.

Although the magnitude of a difference between a transient yaw rate of a vehicle and an actual yaw rate of the vehicle is dependent on vehicle speed, the value in which the magnitude of a difference between a transient yaw rate of a vehicle and an actual yaw rate of the vehicle is transferred to the magnitude of steered angle deviation of the front wheels is not dependent on vehicle speed. According to above-described configuration, estimated value of a time constant coefficient of steering response can be derived on the basis of the yaw rate deviation index values which are not dependent on vehicle speed, so that a time constant coefficient of steering response can be estimated without being affected by vehicle speed. It is to be noted that steered angle deviation of the front wheels is a difference between steered angle of the front wheels for achieving a transient yaw rate of a vehicle and an actual steered angle of the front wheels.

The above-mentioned configuration may be such that: the device increasingly adjusts the estimated value of a time constant coefficient of steering response when the phase of the transient yaw rates is leading to that of the actual yaw rate but the device decreasingly adjusts the estimated value of a time constant coefficient of steering response when the phase of the transient yaw rates is behind that of the actual yaw rate.

According to this configuration, a estimated value of time constant coefficient of steering response can be adjusted so that a estimated value of time constant coefficient of steering response is approximated to a real value by reducing the phase difference between transient yaw rate of the vehicle and actual yaw rate of the vehicle.

The above-mentioned configuration may be such that: the device estimates a time constant coefficient of steering response individually for clockwise turning and counter-clockwise turning.

According to this configuration, a time constant coefficient of steering response can be estimated for both clockwise turning and counter-clockwise turning even when turning characteristic differs according to turning direction of the vehicle for the reason, for example, that gravity center is not at the center in lateral direction of the vehicle or the position of gravity center varies so much in lateral direction of the vehicle.

The above-mentioned configuration may be such that: the device estimates a time constant coefficient of steering response individually for each area of lateral acceleration of the vehicle.

The magnitude of a difference between transient yaw rate of the vehicle and actual yaw rate of the vehicle varies according to magnitude of lateral acceleration of the vehicle. According to above-described configuration, a time constant coefficient of steering response can be estimated for each area of lateral acceleration, so that a time constant coefficient of steering response can be estimated without being affected by magnitude of lateral acceleration of the vehicle.

In a two-wheel model of a vehicle shown in FIG. 20, the mass and yaw inertia moment of a vehicle are denoted by M and I, respectively; the distances between a gravity center 102 of the vehicle and between front wheel axle and rear wheel axle are denoted by Lf and Lr, respectively; and wheel base of the vehicle is denoted by L (=Lf+Lr). Cornering forces of a front vehicle wheel 100*f* and rear vehicle wheel 100*r* are denoted by Ff and Fr, respectively and Cornering powers of the front wheel and the rear wheel are denoted by Kf and Kr, respectively. Actual steered angle of the front wheel I 100*f* is denoted by δ; slip angles of the front wheel and the rear wheel are denoted by $β_f$ and $β_r$, respectively; and slip angle of the vehicle body is denoted by β. Lateral acceleration of the vehicle is denoted by Gy; yaw rate of the vehicle is denoted by γ; vehicle speed is denoted by V and yaw angular acceleration of the vehicle (differential value of yaw rate γ) is denoted by γd. Under-described equations 1 to 6 are derived from the equilibrium of forces and moment, and the like.

$$MGy = Ff + Fr \quad (1)$$

$$I\gamma d = LfFf - LrFr \quad (2)$$

$$Ff = -Kf\beta f \quad (3)$$

$$Fr = -Kr\beta r \quad (4)$$

$$\beta f = \beta (Lf/V)\gamma - \delta \quad (5)$$

$$\beta r = \beta + (Lr/V)\gamma \quad (6)$$

Based on the above-described equations 1 to 6, the under-mentioned equation 7 is established.

$$\left(\frac{Lr}{Kf} - \frac{Lf}{Kr}\right)\frac{M}{L}Gy + \left(\frac{1}{Kf} + \frac{1}{Kr}\right)\frac{I}{L}\gamma d = \delta - \frac{L}{V}\gamma \quad (7)$$

Vehicle speed V is now assumed to be constant and Laplace operator is denoted by s. By Laplace transforming of the above-described equation 7 and rearranging it with respect to yaw rate γ, the under-mentioned equations 8 to 10 are established and by these equations a standard yaw rate γ(s) is derived.

$$\gamma(s) = \frac{1}{1 + TpVs}\left(\frac{\delta(s)}{L} - KhGy(s)\right)V \quad (8)$$

$$Kh = \frac{M}{L^2}\left(\frac{Lr}{Kf} - \frac{Lf}{Kr}\right) \quad (9)$$

$$Tp = \frac{I}{L^2}\left(\frac{1}{Kf} + \frac{1}{Kr}\right) \quad (10)$$

Kh in the above-described equation 9 is a stability factor and Tp in the above-described equation 10 is a coefficient multiplied to a vehicle speed V in a time constant of first order delay system having a time constant which is dependent on vehicle speed, that is, the coefficient referred to in this specification as "a time constant coefficient of steering response". These values are parameters which characterize a steering response in connection with yaw movement of a vehicle, i.e. a turning characteristic of a vehicle. The above-described equation 8 is an equation for calculating a yaw rate γ of a vehicle on the basis of actual steered angle of front wheel δ, vehicle speed V and lateral acceleration Gy. The yaw rate calculated from the linearized model is referred to as a transient yaw rate γtr having first order delay relationship relative to a steady-state standard yaw rate γt represented by the under-mentioned equation 11.

$$\gamma t = \left(\frac{\delta}{L} - KhGy\right)V \quad (11)$$

Therefore, the above-mentioned configuration may be such that: a transient yaw rate γtr is calculated in accordance with the above-described equation 8 and the estimated value of a time constant coefficient Tp of steering response is adjusted on the basis of the relationship between a transient yaw rate γtr and an actual yaw rate γ so that a transient yaw rate γtr approaches an actual yaw rate γ.

The above-mentioned configuration may be such that: yaw rate deviation index values are integrated values of indexes which index differences in magnitude between transient yaw rates of the vehicle and an actual yaw rate of the vehicle.

The above-mentioned configuration may be such that: the component equal to or lower than a first prescribed frequency is removed from an actual yaw rate by a high-pass filtering procedure and the component equal to or lower than a second prescribed frequency is removed from a transient yaw rate by a high-pass filtering procedure.

The above-mentioned configuration may be such that: the first and second prescribed frequencies are same to each other.

The above-mentioned configuration may be such that: assuming vehicle speed is denoted by V and wheel base of a vehicle is denoted by L, the value in which the magnitude of a deviation between a transient yaw rate and an actual yaw rate is transferred to the magnitude of steered angle deviation of the front wheels is calculated by multiplying L/V to the magnitude of a deviation between a transient yaw rate and an actual yaw rate.

The above-mentioned configuration may be such that: device the estimated value of a time constant coefficient of steering response is adjusted with an increasing or decreasing adjustment value and an increasing or decreasing adjustment value is gradually reduced in magnitude.

The above-mentioned configuration may be such that: the adjustment of the estimated value of a time constant coefficient of steering response is terminated when the magnitude of a difference between an estimated value of a time constant coefficient of steering response in present cycle and an estimated value of a time constant coefficient of steering response in previous cycle becomes lower than a reference value.

The above-mentioned configuration may be such that: the estimated value of a time constant coefficient of steering response is adjusted with an increasing or decreasing adjustment value so that it does not depart from an range having prescribed minimum and maximum values of a time constant coefficient of steering response.

The above-mentioned configuration may be such that: a time constant coefficient of steering response is not estimated when the magnitude of a difference between a high-pass filtered transient yaw rate of a vehicle and a high-pass filtered actual yaw rate of a vehicle is lower than a reference value.

BEST MODE FOR CARRYING OUT THE INVENTION

The present invention will now be described in detail with respect to preferred embodiments by referring to the accompanying drawings.

First Embodiment

Figure 1:
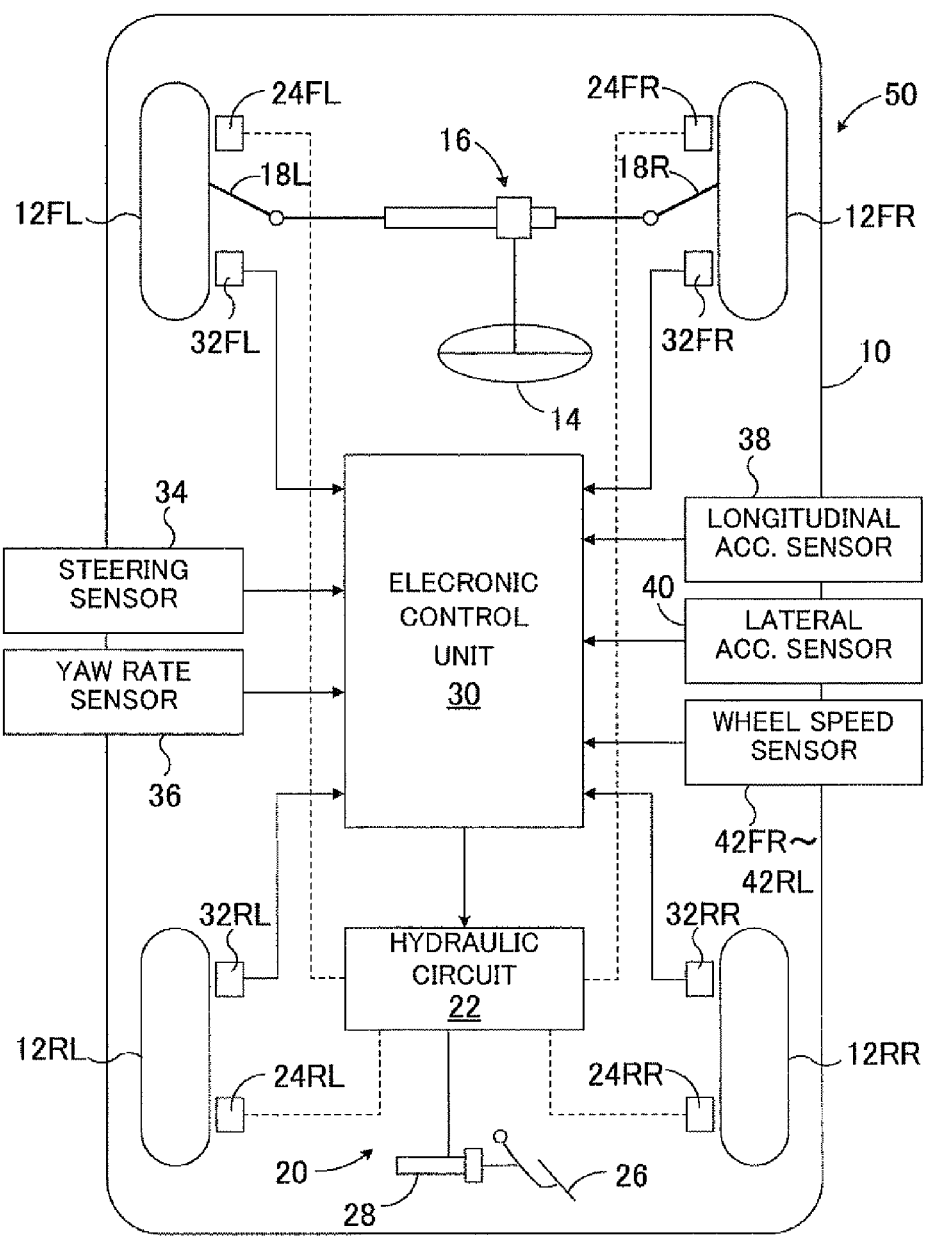
FIG. 1 is a schematic diagram showing a first embodiment of the turning characteristic estimation device according to the present invention, the device being applied to a vehicle motion control device.

FIG. 1 is a schematic diagram showing a first embodiment of a turning characteristic estimation device according to the present invention, the device being applied to a vehicle motion control device.

In FIG. 1, 50 denotes an entire vehicle motion control device for a vehicle 10. The turning characteristic estimation device according to the present invention is a part of the vehicle motion control device 50. The vehicle 10 has a right front wheel 12FR, a left front wheel 12FL, a right rear wheel 12RR, and a left rear wheel 12RL. The right and left front wheels 12FR, 12FL, which are steerable wheels, are steered by an unillustrated steering apparatus of a rack and pinion type via right and left tie rods 18R and 18L, respectively. The steering apparatus is driven in response to steering operation of a steering wheel 14 by a driver.

Braking forces of the left and right front wheels 12FL, 12FR and the left and right rear wheels 12RL, 12RR are controlled through control of respective braking pressures of corresponding wheel cylinders 24FL, 24FR, 24RL, 24RR by a hydraulic circuit 22 of a braking apparatus 20. The hydraulic circuit 22 includes a reservoir, an oil pump, and various valve units, etc., although they are not illustrated. Pressure in each wheel cylinder is usually controlled by pressure in a master cylinder 28 driven by driver's operation of depressing a brake pedal 26, and, as will be described below in detail, it is controlled as necessary by an electronic control unit 30.

The wheel cylinders of the wheels 12FR to 12RL is provided with pressure sensors 32FR to 32RL for detecting pressures Pi (i=fr, fl, rr, rl) in the respective wheel cylinders. A steering column to which the steering wheel 14 is coupled is provided with a steering sensor 34 for detecting a steering angle θ.

The vehicle 10 has a yaw rate sensor 36 for detecting an actual yaw rate γ of the vehicle, a longitudinal acceleration sensor 38 for detecting longitudinal acceleration Gx of the vehicle, a lateral acceleration sensor 40 for detecting a lateral acceleration Gy of the vehicle, and wheel speed sensors 42FR to 42RL for detecting wheel speeds Vwi (i=fr, fl, rr, rl) of the wheels. It is to be noted that the steering sensor 34, the yaw rate sensor 36 and the acceleration sensor 40 detect a steering angle, an actual yaw rate, and a lateral acceleration, respectively as positive values when the vehicle turns left.

As shown, the electronic control unit 30 are supplied with signals indicating pressures Pi detected by the pressure sensors 32FR-32RL, a signal indicating steering angle θ detected by the steering angle sensor 34, a signal indicating actual yaw rate γ detected by the yaw rate sensor 36, a signal indicating longitudinal acceleration Gx detected by the longitudinal acceleration sensor 38, a signal indicating lateral acceleration Gy detected by the lateral acceleration sensor 40, and signals indicating wheel speeds Vwi detected by the wheel speed sensors 42FR-42RL.

Although not shown in detail in the figure, the electronic control unit 30 includes a micro computer having a CPU, a ROM, a EEPROM, a RAM, a buffer memory and input/output ports and these components are connected with one another by bi-directional common bus. The ROM stores default values of stability factor Kh and time constant coefficient Tp of steering response which are utilized to calculate a standard yaw rate γt. These default values are set for each vehicle when it is shipped. The EEPROM stores an estimated value of time constant coefficient Tp of steering response and the like. As explained in detail hereinafter, the estimated value of time constant coefficient Tp of steering response renewed by calculating it on the basis of running data when the vehicle is in turning condition.

Figure 2:
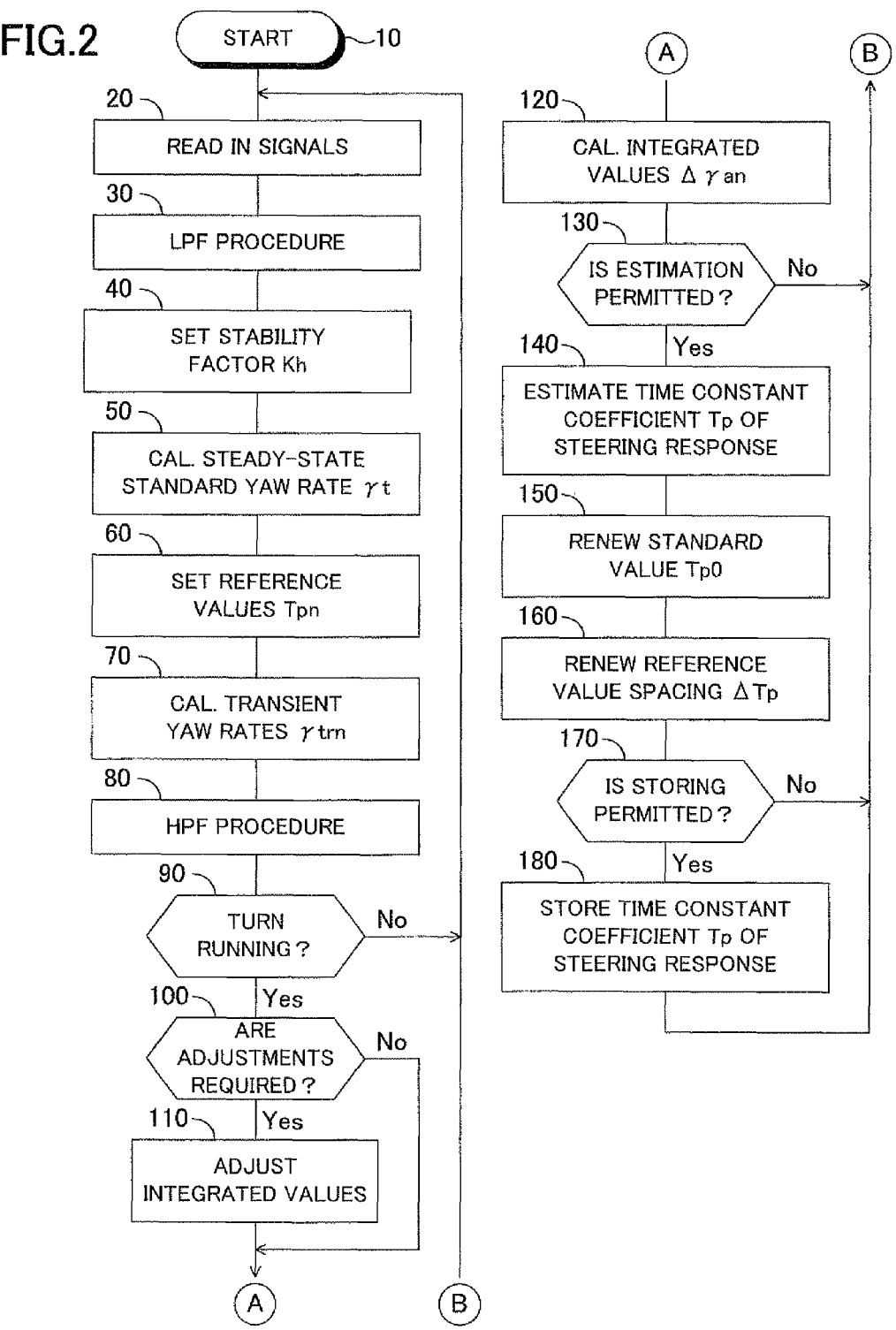
FIG. 2 is a flowchart showing a routine for calculating a time constant coefficient Tp of steering response by estimation in the first embodiment.

After the vehicle starts to turn, the electronic control unit 30, by following a flow chart shown in FIG. 2 as described later, calculates a steady-state standard yaw rate γt on the basis of turn running data such as steering angle and calculates five transient yaw rates γtrn (n=1-5) which have a relationship of first order delay to the steady-state standard yaw rate γt for five reference values of time constant coefficient Tp of steering response having different magnitudes to each other.

When a predetermined condition is satisfied, the electronic control unit 30 calculates an estimated value of time constant coefficient Tp of steering response on the basis of a reference value of time constant coefficient Tp of steering response which corresponds to a minimum value in magnitude among the differences between an actual vehicle yaw rate γ and transient yaw rates γtrn and stores the values in the buffer memory. After having calculated an estimated value of time constant coefficient Tp of steering response, the electronic control unit 30 renews a standard value Tp0 and a reference value spacing ΔTp for calculating five reference values of time constant coefficient Tp of steering response on the basis of the estimated value.

Furthermore, the electronic control unit 30 calculates a target yaw rate γtt corresponding to a transient yaw rate γtr using an estimated value of time constant coefficient Tp of steering response stored in the EEPROM and calculates a yaw rate deviation Δγ which is a difference between a detected yaw rate γ and the target yaw rate γtt. The electronic control unit 30 decides whether or not vehicle turning behavior is aggravated by judging whether or not the magnitude of the yaw rate deviation Δγ exceeds a reference value γo (a positive constant). If the vehicle turning behavior is aggravated, the electronic control unit 30 controls the vehicle motion to stabilize vehicle turning behavior. In this connection, it is to be noted that the vehicle motion control conducted by the electronic control unit 30 may be any control so long as it controls vehicle motion on the basis of the target yaw rate γtt which is calculated using an estimated value of time constant coefficient Tp of steering response.

Next, a calculation routine for estimating a time constant coefficient Tp of steering response in the first embodiment will be described with reference to the flowchart shown in FIG. 2. Control according to the flowchart shown in FIG. 2 is started when an unillustrated ignition switch is turned on, and is repeatedly executed at predetermined time intervals. The same goes in the embodiments described hereinafter.

First, the control is started in step 10, and in step 20, signals representing steering angle θ, etc. detected by the associated sensors are read.

In step 30, a low-pass filtering procedure is conducted on each signal indicating steering angle θ, etc. to remove high frequency noise. In this connection, the low-pass filtering procedure may be, for example, a first order low-pass filtering having a cut-off frequency of 3.4 Hz.

In step 40, a stability factor Kh is set to its default value which was set in advance when the vehicle was shipped. It is to be noted that in the case where a stability factor is estimated on the basis of vehicle running data, a stability factor Kh may be set to an estimated value.

In step 50, a vehicle speed V is calculated on the basis of vehicle wheel speeds Vwi; a steered angle δ of front wheels is calculated on the basis of steering angle θ; and a standard yaw rate γt is calculated in accordance with the above-mentioned equation 11.

In step 60, five reference values Tpn (n=1-5) are set in accordance with the under-mentioned equations 12-16 on the basis of a standard value Tp0 of time constant coefficient Tp of steering response which was renewed in step 150 in a previous cycle and a reference value spacing ΔTp which was renewed in step 160 in a previous cycle. In the situation where a standard value Tp0 and a reference value spacing ΔTp have not yet been renewed, the five reference values are set to the default values stored in the EEPROM.

$$Tp1 = Tp0 - 2\Delta Tp \tag{12}$$

$$Tp2 = Tp0 - \Delta Tp \tag{13}$$

$$Tp3 = Tp0 \tag{14}$$

$$Tp4 = Tp0 + \Delta p \tag{15}$$

$$Tp5 = Tp0 + 2\Delta Tp \tag{16}$$

In step 70, five transient yaw rates γtrn (n=1-5) are calculated in accordance with the under-mentioned equation 17 corresponding to the above-mentioned equations 8 and 11 for the five reference values Tpn.

$$\gamma trn = \frac{1}{1 + TpnVs} \gamma t \tag{17}$$

In step 80, high-pass filtering procedures are conducted on the actual yaw rate γ which was low-pass filtered in step 30 and the transient yaw rates γtrn which was calculated in step 70 to remove influences due to zero point offset in the sensors. In this connection, the high-pass filtering procedure may be, for example, a first-order high-pass filtering having a cut-off frequency of 0.2 Hz.

Since the low-pass filtering procedure is conducted in step 30 as described above, the above-mentioned high-pass filtering procedure generates the results obtained by conducting a band-pass filtering procedure on the actual yaw rate γ and the transient yaw rates γtrn. Therefore, the actual yaw rate γ and the transient yaw rates γtrn which were high-pass filtered in step 80 are referred to a band-pass filtered actual yaw rate γbpf and band-pass filtered transient yaw rates γtrbpfn (n=1-5).

In step 90, a decision is made as to whether or not the vehicle is under a turn running condition. If a negative decision is made, the control returns to step 20. If a positive decision is made, the control proceeds to step 100. In this connection, the decision as to whether or not the vehicle is under a turn running condition may be made by deciding whether or not the absolute value of lateral acceleration Gy of the vehicle is equal to or larger than a reference value, deciding whether or not the absolute value of actual yaw rate γ of the vehicle is equal to or larger than a reference value, or deciding whether or not the absolute value of the product of actual yaw rate γ of the vehicle and vehicle speed V is equal to or larger than a reference value, under the situation where the vehicle runs at a vehicle speed not lower than a reference value.

In step 100, a decision is made as to whether or not adjustments are to be executed on integrated values Δγan (n=1-5) of the yaw rate deviation index values calculated in step 120. If a positive decision is made, integrated values Δγan of the yaw rate deviation index values are cleared to 0 in step 110. If a negative decision is made, the control proceeds to step 120.

It is to be understood that a decision may be made that adjustments are to be executed on integrated values Δγan when either of the under-mentioned (A1) and (A2) is satisfied.

(A1) A standard value Tp0 of time constant coefficient Tp of steering response was renewed in step 150 in previous cycle.

(A2) A reference value spacing ΔTp was renewed in step 160 in previous cycle.

In addition, in the case where a stability factor Kh is estimated in step 40, the under-mentioned (A3) is appended as an additional decision condition and a decision may be made that adjustments are to be executed on integrated values Δγan of the yaw rate deviation index values when any of the (A1) to (A3) is satisfied.

(A3) An absolute value of the deviation ΔKh is equal to or larger than a reference value for stability factor deviation, the deviation ΔKh being the deviation between the stability factor Kh when integrated values Δγan of the yaw rate deviation index values were adjusted in a ratest cycle and the stability factor Kh estimated in step 40 in the present cycle In step 120, integrated values Δγan (n=1-5) of the yaw rate deviation index values are calculated in accordance with the under-mentioned equation 18 as the integrated values in which the magnitude of each deviation between a band-pass filtered actual yaw rate γbpf and band-pass filtered transient yaw rates γtrbpfn is transferred to the magnitude of steered angle deviation of the front wheels.

$$\Delta\gamma an = present\ \Delta\gamma an + |\gamma trbpfn - \gamma bpf|\frac{L}{V} \qquad (18)$$

It is to be noted that integrated values Δγan of the yaw rate deviation index values may be calculated in accordance with the under-mentioned equation 19 as the integrated values of the deviations in magnitude between a band-pass filtered actual yaw rate γbpf and a band-pass filtered transient yaw rates γtrbpfn.

$$\Delta\gamma an = present\ \Delta\gamma 5an + |\gamma trbpfn - \gamma bpf| \qquad (19)$$

In step 130, a decision is made as to whether or not estimation of time constant coefficient Tp of steering response is permitted. If a negative decision is made, the control returns to step 20. If a positive decision is made, the control proceeds to step 140.

In this connection, it is to be noted that when under-mentioned (B1) or (B2) is satisfied, a decision may be made that the estimation of time constant coefficient Tp of steering response is permitted.

(B1) A time not less than a reference time has passed since the integrated values Δγan of the yaw rate deviation index values are cleared to 0 in step 110 in previous cycle.

(B2) The minimum value among the five integrated values Δγa1-Δγa5 of the yaw rate deviation index values is not less than a reference value.

In step 140, the minimum value Δγam among the five integrated values Δγa1-Δγa5 of the yaw rate deviation index values is decided (m is any one of 1-5). An estimated value of time constant coefficient Tp of steering response is set to a time constant coefficient Tpm of steering response which corresponds to the minimum value Δγam among the integrated values of the yaw rate deviation index values.

In step 150, a standard value Tp0 of time constant coefficient Tp of steering response which is used to set five reference values Tpn in step 60 in the next cycle is renewed to the time constant coefficient Tp (=Tpm) of steering response estimated in step 140 and is stored in the buffer memory.

In step 160, with Ka being a coefficient larger than 0 and smaller than 1 and a guard minimum value of a reference value spacing ΔTp being ΔTpmin (a positive constant), a reference value spacing ΔTp is renewed to a larger one of Ka*(present reference value spacing ΔTp) and the guard minimum value ΔTpmin, and is stored in the buffer memory.

In step 170, a decision is made as to whether or not the estimated value of time constant coefficient Tp of steering response is permitted to be stored in the EEPROM. If a negative decision is made, the control returns to step 20. If a positive decision is made, in step 180, the estimated value of time constant coefficient Tp of steering response is stored in the EEPROM so as to renew the estimated value of time constant coefficient Tp of steering response stored in the EEPROM.

In this connection, it is to be noted that when the magnitude of the difference between the renewed reference value spacing ΔTp and the guard minimum value ΔTpmin is not larger than a reference value of the difference (a positive constant), a decision may be made that the estimated value of time constant coefficient Tp of steering response is permitted to be stored in the EEPROM.

In the operation of the first embodiment having the configuration as described above, in step 50, a steady-state standard yaw rate γt is calculated and in step 60, five reference values having a different magnitude to each other are set. In step 70, transient yaw rates γtrn are calculated for the five reference values Tpn on the basis of the steady-state standard yaw rate γt.

In step 120, integrated values Δγa1-Δγa5 of the yaw rate deviation index values are calculated as the integrated values in which the magnitude of each deviation between a band-pass filtered actual yaw rate γbpf and a band-pass filtered transient yaw rates γtrbpfn is transferred to the magnitude of steered angle deviation of the front wheels.

In step 140, the minimum value Δγam among the five integrated values Δγa1-Δγa5 of the yaw rate deviation index values is decided and an estimated value of time constant coefficient Tp of steering response is set to a time constant coefficient Tpm of steering response which correspond to the minimum value Δγam among the integrated values of the yaw rate deviation index values.

Thus, according to the first embodiment, transient yaw rates γtrn are calculated for the five reference values Tpn and an estimated value of time constant coefficient Tp of steering response is set to a reference value which renders minimum the magnitude of the deviation between an actual yaw rate γ and transient yaw rates γtrn. The estimated value of time constant coefficient Tp of steering response can be set to a time constant coefficient Tp of steering response which is nearest to an actual yaw rate γ, i.e. a reference value which is nearest to an actual time constant coefficient of steering response.

According to the first embodiment, in step 150, a standard value Tp0 is renewed to the time constant coefficient Tp (=Tpm) of steering response estimated in step 140. In step 160, a reference value spacing ΔTp is renewed so that its magnitude becomes smaller. Further in step 60, five reference values having a different magnitude to each other are set on the basis of a renewed standard value Tp0 of time constant coefficient Tp of steering response and a reference value spacing ΔTp.

Therefore, it is possible to gradually reduce the magnitude of each difference between transient yaw rates γtrn and an actual yaw rate γ, to thereby gradually make transient yaw rates γtrn be closer to an actual yaw rate γ.

Further, according to the first embodiment, a steady-state standard yaw rate γt is calculated on the basis of steering angle θ, etc. which are low-pass filtered in step 30. In step 80, high-pass filtering procedures are conducted on the actual yaw rate γ and the transient yaw rates γtrn calculated in step 70 on the basis of the steady-state standard yaw rate γt.

Therefore, it is possible to remove high frequency noise included in signals indicating detected steering angle θ, etc. and as well to remove influences due to zero point offset in the sensors. Since the differences between an actual yaw rate and transient yaw rates can be calculated without the influences due to zero point offset in the sensors, a time constant coefficient Tp of steering response can more accurately be estimated as compared with a case where no high-pass filtering procedure is conducted on the actual yaw rate γ and the transient yaw rates γtrn. The number of high-pass filtering procedures can be reduced so that calculation load on the electronic control unit 30 can be alleviated as compared with a case where high-pass filtering procedures are conducted on steering angle θ and lateral acceleration Gy which are used to calculate a steady-state standard yaw rate γt.

It is to be understood that band-pass filtering procedures may be conducted on an actual yaw rate γ and transient yaw rates γtrn without conducting low-pass filtering procedures on steering angle θ, etc. In that case, the number of calculations required for filtering procedures can be reduced as compared with the above-mentioned first embodiment while effectively removing high frequency noise so that calculation load on the electronic control unit 30 can further be alleviated.

Further, according to the first embodiment, an estimated value of time constant coefficient Tp of steering response is calculated on the basis of the integrated values Δγan of the yaw rate deviation index values which is based on the magnitudes of the deviations between a band-pass filtered actual yaw rate γbpf and a band-pass filtered transient yaw rates γtrbpfn. Therefore, it is possible to reduce the risk that time constant coefficient Tp of steering response is inaccurately calculated due to instant fluctuations in an actual yaw rate γ and transient yaw rates γtrn as compared with the case where an estimated value of time constant coefficient Tp of steering response is calculated on the basis of the magnitudes of the deviations between a band-pass filtered actual yaw rate γbpf and band-pass filtered transient yaw rates γtrbpfn.

Further, according to the first embodiment, integrated values Δγan of the yaw rate deviation index values are calculated as the integrated values in which the magnitude of each deviation between an actual yaw rate γbpf and transient yaw rates γtrbpfn is transferred to the magnitude of steered angle deviation of the front wheels. Accordingly, time constant coefficient Tp of steering response can be estimated without being influenced by vehicle speed V. Therefore, time constant coefficient Tp of steering response can accurately be estimated as compared with the case where integrated values Δγan of the yaw rate deviation index values are, for example, integrated values of the magnitude of each deviation between an actual yaw rate γbpf and transient yaw rates γtrbpfn. It is also possible to avoid cumbersome procedures to estimate time constant coefficient Tp of steering response for each vehicle speed V or to change time constant coefficient Tp of steering response used to calculate a target yaw rate γtt for each vehicle speed V to thereby reduce the number of required calculations and the capacity of storing device.

Further, according to the first embodiment, in step 100, a decision is made as to whether or not adjustments are to be executed on integrated values Δγan of the yaw rate deviation index values and if a positive decision is made, integrated values Δγan of the yaw rate deviation index values are cleared to 0 in step 110. Therefore, it is possible to prevent the previous integrated values Δγan of the yaw rate from adversely influencing the estimation of time constant coefficient Tp of steering response under such a situation where a standard value Tp0 of time constant coefficient Tp of steering response or a reference value spacing ΔTp was renewed.

Further, according to the first embodiment, in step 130, a decision is made as to whether or not estimation of time constant coefficient Tp of steering response is permitted and if a positive decision is made, the controls of step 140 and the following steps are executed. Therefore, estimation of time constant coefficient Tp of steering response and renewal of a standard value Tp0 of time constant coefficient Tp of steering response or a reference value spacing ΔTp can be prevented from being unnecessarily frequently conducted and from being conducted under the situation where integrated values of the yaw rate deviation index values are small.

Further, according to the first embodiment, in step 170, a decision is made as to whether or not the estimated value of time constant coefficient Tp of steering response is permitted to be stored and if a positive decision is made, in step 180, the estimated value of time constant coefficient Tp of steering response is stored in the EEPROM. Therefore, the estimated value of time constant coefficient Tp of steering response can be stored in the EEPROM at a stage when the estimated value of time constant coefficient Tp of steering response substantially conforms to an actual time constant coefficient of steering response. That is, it is possible to repeat to estimate time constant coefficient Tp of steering response until the estimated value of time constant coefficient Tp of steering response substantially conforms to an actual time constant coefficient of steering response to thereby gradually make transient yaw rates γtrn be closer to an actual yaw rate γ.

Further, according to the first embodiment, in step 90, a decision is made as to whether or not the vehicle is under the turn running condition and if a positive decision is made, the control procedures of step 100 and the following steps are executed. Therefore, it is possible to prevent step 100 and the following steps from being unnecessarily conducted and time constant coefficient Tp of steering response from being inaccurately estimated under a situation where the vehicle is not turning and accordingly accurate estimation of time constant coefficient Tp of steering response is impossible.

Second Embodiment

Figure 3:
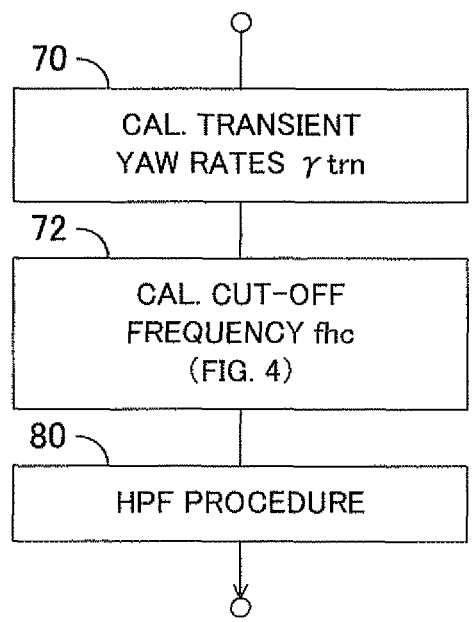
FIG. 3 is a flowchart showing a main portion of a routine for calculating a time constant coefficient Tp of steering response by estimation in a second embodiment of the turning characteristic estimation device according to the present invention which is configured as a modification of the first embodiment.

FIG. 3 is a flowchart showing a main portion of a routine for calculating a time constant coefficient Tp of steering response by estimation in a second embodiment of the turning characteristic estimation device according to the present invention which is configured as a modification of the first embodiment. In FIG. 3, steps identical to those shown in FIG. 2 are denoted by the same step numbers. The same goes in the flowcharts for the embodiments described hereinafter.

Figure 4:
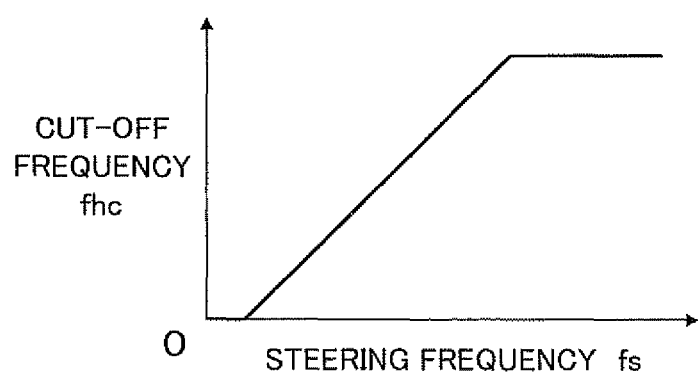
FIG. 4 is a graph showing a relationship between steering frequency fs and a cutoff frequency fhc of a high-pass filtering procedure.

In this second embodiment, after completion of step 70, the number of reciprocating steering operations by a driver per unit time is calculated as steering frequency fs in step 72. A cutoff frequency fhc of a high-pass filtering procedure in step 80 is also calculated on the basis of the steering frequency fs from a map corresponding to the graph shown in FIG. 4 so that as the steering frequency fs decreases, the cutoff frequency fhc lowers.

In the high-pass filtering procedure on actual yaw rate γ and transient yaw rates γtrn in step 80, cutoff frequency is set to the cutoff frequency fhc calculated in step 72.

In the above-described first embodiment, the cutoff frequency fhc of a high-pass filtering procedure in step 80 is constant. Accordingly, if the cutoff frequency fhc is set so high that the influence of zero point offset in the sensors may surely be removed, there arises a risk that time constant coefficient Tp of steering response can not be estimated under a situation where the number of reciprocating steering operations by a driver per unit time is small. In contrast, if the cutoff frequency fhc is set so low, there arises a risk that the adverse influence of zero point offset in the sensors can not be removed under a situation where the number of reciprocating steering operations by a driver per unit time is large.

According to the second embodiment, the cutoff frequency fhc is variably set in accordance with steering frequency fs so that as the steering frequency fs is lower, the cutoff frequency fhc lowers. Therefore, estimation of time constant coefficient Tp of steering response can be prevented from being defied under a situation where the number of reciprocating steering operations by a driver per unit time is small while effectively removing the influence of zero point offset in the sensors under a situation where the number of reciprocating steering operations by a driver per unit time is large.

It is to be noted that although the cutoff frequency fhc is calculated on the basis of the steering frequency fs from the map, it may be calculated by a function of the steering frequency fs.

Third Embodiment

Figure 5:
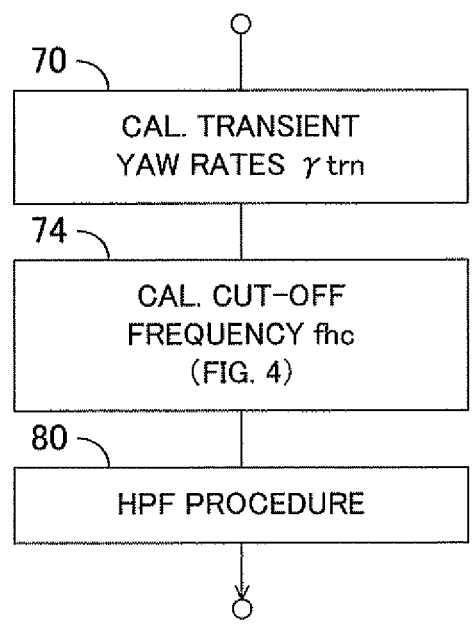
FIG. 5 is a flowchart showing a main portion of a routine for calculating a time constant coefficient Tp of steering response by estimation in a third embodiment of the turning characteristic estimation device according to the present invention which is configured as a modification of the first embodiment.

FIG. 5 is a flowchart showing a main portion of a routine for calculating a time constant coefficient Tp of steering response by estimation in a third embodiment of the turning characteristic estimation device according to the present invention which is configured as a modification of the first embodiment.

Figure 6:
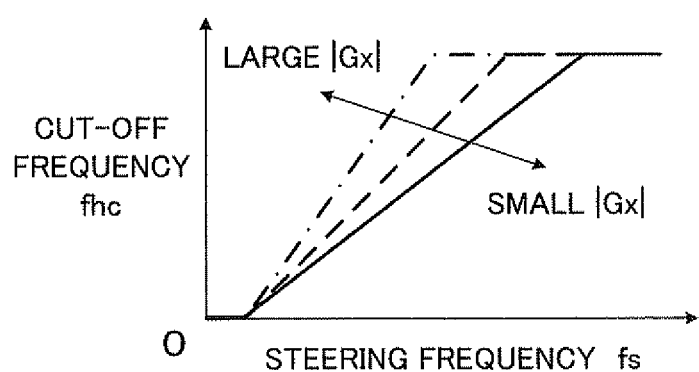
FIG. 6 is a graph showing a relationship among steering frequency fs, a cutoff frequency fhc of a high-pass filtering procedure and an absolute value of longitudinal acceleration Gx of the vehicle.

In this third embodiment, after completion of step 70, the number of reciprocating steering operations by a driver per unit time is calculated as steering frequency fs in step 74. A cutoff frequency fhc of a high-pass filtering procedure is also calculated on the basis of the steering frequency fs and longitudinal acceleration Gx of the vehicle from a map corresponding to the graph shown in FIG. 6 so that as the steering frequency fs decreases, the cutoff frequency fhc lowers and as the absolute value of longitudinal acceleration Gx of the vehicle increases, the cutoff frequency fhc also increases.

In the high-pass filtering procedure on actual yaw rate γ and transient yaw rates γtrn in step 80, cutoff frequency is set to the cutoff frequency fhc calculated in step 74.

Assume that errors of zero point offset in the sensors in connection with yaw rate γ of the vehicle, lateral acceleration Gy of the vehicle, and steered angle of the front wheels are γ0, Gy0 and δ0, respectively. Then, detected values of yaw rate γ of the vehicle, lateral acceleration Gy of the vehicle, and steered angle of the front wheels are γ+γ0, Gy+Gy 0 and δ+δ0, respectively. Accordingly, assuming that design value and real value of stability factor are Khde and Khre, respectively, the deviation Δγt between steady-state standard yaw rate γt and detected yaw rate γ when the vehicle is under steady-state turn condition can be expressed by the following equation 20.

$$\Delta \gamma t = \left(\frac{V(\delta + \delta 0)}{L} - Khde(Gy + Gy0)V\right) - (\gamma + \gamma 0) \quad (20)$$

$$= \left(\frac{V(\delta + \delta 0)}{L} - Khde(Gy + Gy0)V\right) - \left(\frac{V\delta}{L} - KhreGyV + \gamma 0\right)$$

$$= (Khre - Khde)GyV + \frac{V\delta 0}{L} - KhdeGy0L - \gamma 0$$

By multiplying L/V on both sides of the above equation 20 to convert the yaw rate deviation Δγt into the steered angle deviation Δδt of the front wheels, the latter can be expressed by the following equation 21.

$$\Delta \delta t = (Khre - Khde)GyL + \delta 0 - KhdeGy0L - \frac{\gamma 0 L}{V} \quad (21)$$

Accordingly, the influence of zero point offset in the sensors is "δ0-KhdeGy0L-γ0L/V". While "δ0-KhdeGy0L" is constant, γ0L/V changes according to vehicle speed V. Therefore, as the change in vehicle speed V is larger, that is, as the magnitude of longitudinal acceleration Gx of the vehicle is larger, the influence of zero point offset in the sensors against the index value of yaw rate deviation increases and, to the contrary, as the magnitude of longitudinal acceleration Gx of the vehicle is lower, the influence of zero point offset in the sensors against the index value of yaw rate deviation decreases.

According to the third embodiment, the cutoff frequency fhc is variably set as well in accordance with longitudinal acceleration Gx of the vehicle so that as the absolute value of longitudinal acceleration Gx of the vehicle is higher, the cutoff frequency fhc of a high-pass filtering procedure increases. Therefore, it is possible not only to achieve the same operation and effect as in the second embodiment, but also to effectively remove the influence of zero point offset in the sensors regardless of the change in vehicle speed V.

It is to be noted that although the cutoff frequency fhc is calculated on the basis of the steering frequency fs and the absolute value of longitudinal acceleration Gx of the vehicle from the map, it may be calculated by a function of the steering frequency fs and the absolute value of longitudinal acceleration Gx of the vehicle.

Fourth Embodiment

Figure 7:
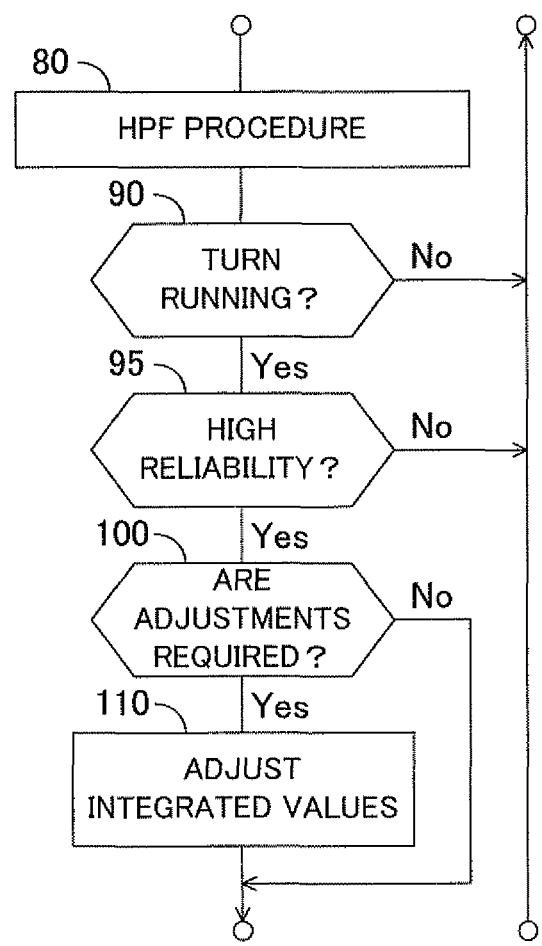
FIG. 7 is a flowchart showing a main portion of a routine for calculating a time constant coefficient Tp of steering response by estimation in a fourth embodiment of the turning characteristic estimation device according to the present invention which is configured as a modification of the first embodiment.

FIG. 7 is a flowchart showing a main portion of a routine for calculating a time constant coefficient Tp of steering response by estimation in a fourth embodiment of the turning characteristic estimation device according to the present invention which is configured as a modification of the first embodiment.

In this fourth embodiment, if it is decided that the vehicle is under turn condition in step 90, step 95 is conducted prior to step 100. In step 95, a decision is made as to whether or not the vehicle is under the condition that allows estimation of a time constant coefficient Tp of steering response with high reliability. If a negative decision is made, the control returns to step 20. If a positive decision is made, the control proceeds to step 100.

It is to be understood that a decision may be made that the vehicle is under the condition that allows estimation of a time constant coefficient Tp of steering response with high reliability when all of the under-mentioned (C1) to (C3) are satisfied.

(C1) The absolute value of steering angle velocity θd which is a time differential value of steering angle velocity θ is not lower than a reference value of steering angle velocity.

(C2) The road is not rough.

(C3) The vehicle is not under braking.

It is to be understood that the condition C1 is based on the consideration that time constant coefficient Tp of steering response represents a transient turning characteristic of the vehicle and it can not accurately be estimated under a situation where magnitude of steering angle velocity is small. The condition C2 is based on the consideration that at a rough road, actual yaw rate γ includes noise and tire grip to road surface may fluctuate. Further, the condition C3 is based on the consideration that in the calculation of steady-state standard yaw rate γt according to the above-mentioned equation 11, no influence of braking force is presupposed.

According to the fourth embodiment, therefore, time constant coefficient Tp of steering response can more accurately be estimated as compared with the first to third embodiments in which a decision is not conducted as to whether or not the vehicle is under the condition that allows estimation of a time constant coefficient Tp of steering response with high reliability.

Fifth Embodiment

Figure 8:
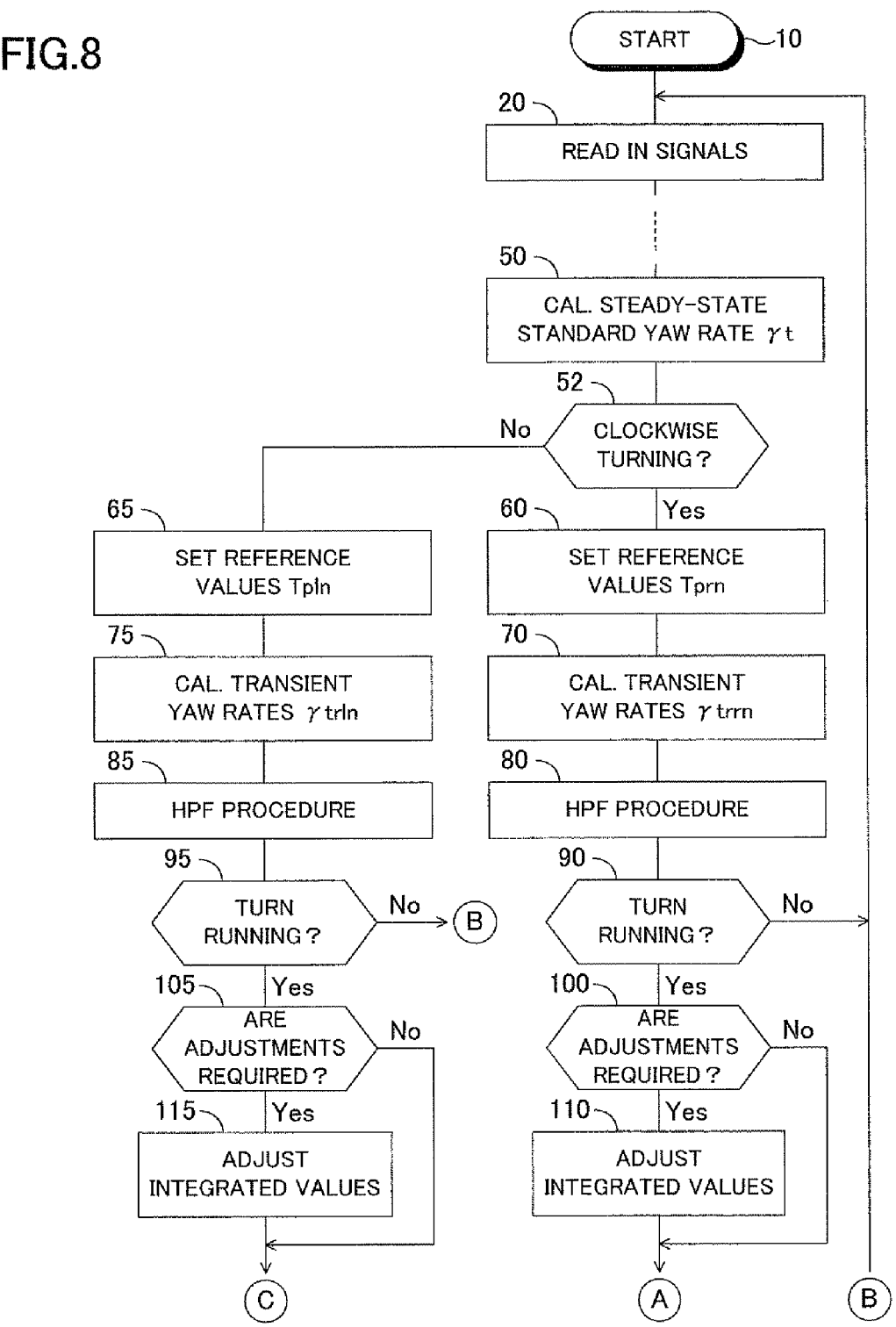
FIG. 8 is a flowchart showing former half portion of a routine for calculating a time constant coefficient Tp of steering response by estimation in a fifth embodiment of the turning characteristic estimation device according to the present invention which is configured as a modification of the first embodiment.
Figure 9:
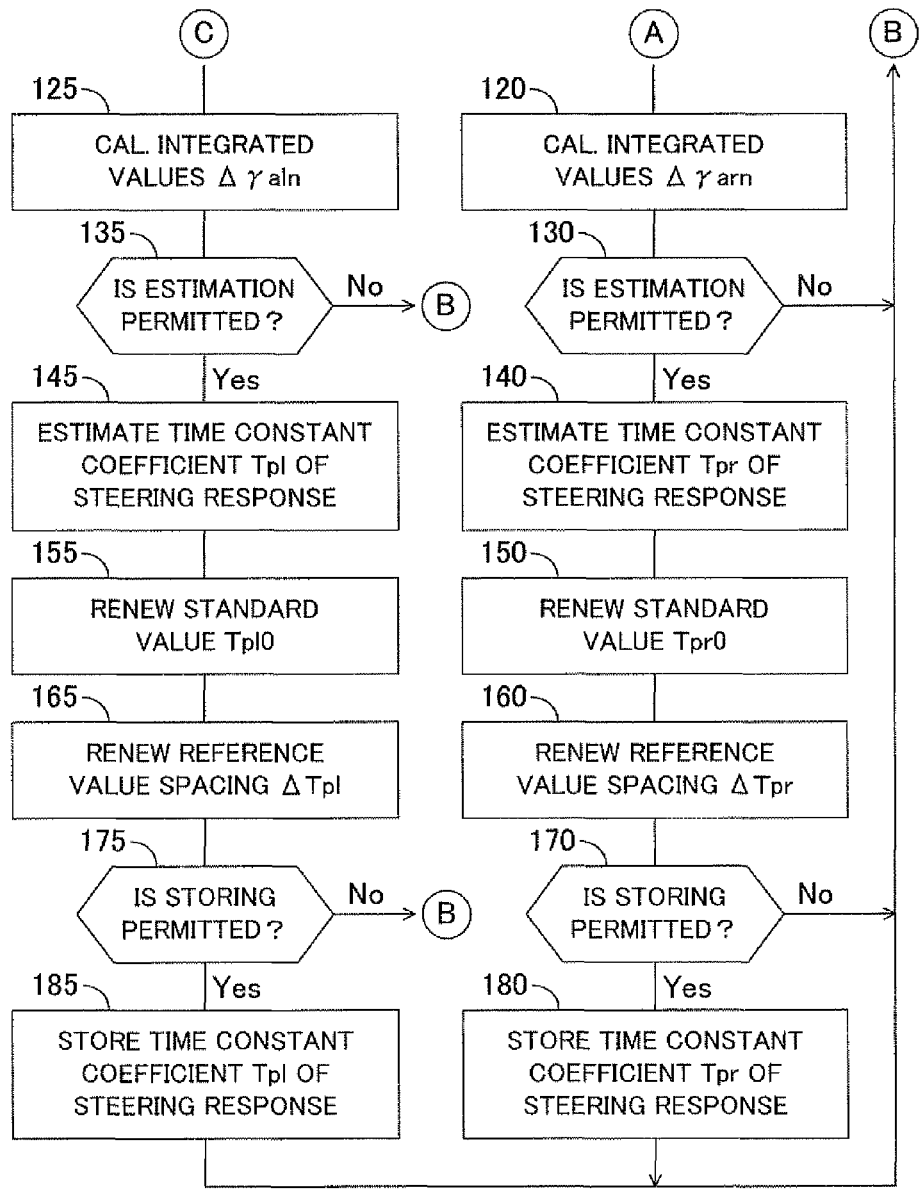
FIG. 9 is a flowchart showing the latter half portion of a routine for calculating a time constant coefficient Tp of steering response by estimation in a fifth embodiment of the turning characteristic estimation device according to the present invention which is configured as a modification of the first embodiment.

FIGS. 8 and 9 are flowcharts showing former half and the latter half, respectively, of a routine for calculating a time constant coefficient Tp of steering response by estimation in a fifth embodiment of the turning characteristic estimation device according to the present invention which is configured as a modification of the first embodiment.

In this fifth embodiment, after completion of step 50, a decision is made as to whether or not the vehicle is under clockwise turning condition in step 52. If a positive decision is made, in steps 60-180, the control procedures same as in steps 60-180 in the first embodiment are executed for clockwise turning of the vehicle. To the contrary, if a negative decision is made, in steps 65-185, the control procedures same as in steps 60-180 in the first embodiment are executed for counter-clockwise turning of the vehicle.

That is, in step 60, five reference values Tprn (n=1-5) for clockwise turning corresponding to reference values Tpn are set and in step 70, five transient yaw rates γtrrn (n=1-5) are calculated for the five reference values Tprn.

In step 80, high-pass filtering procedures are conducted on the actual yaw rate γ and the transient yaw rates γtrrn. In step 100, a decision is made as to whether or not adjustments are to be executed on integrated values Δγarn (n=1-5) of the yaw rate deviation index values calculated in step 120. If a positive decision is made, integrated values Δγarn of the yaw rate deviation index values are cleared to 0 in step 110. If a negative decision is made, the control proceeds to step 120.

In step 120, integrated values Δγarn (n=1-5) of the yaw rate deviation index values for clockwise turning are calculated. In step 140, the minimum value Δγarm among the five integrated values Δγar1-Δγar5 of the yaw rate deviation index values is decided (m is any one of 1-5). An estimated value of time constant coefficient Tpr of steering response for clockwise turning is set to a time constant coefficient Tprm of steering response which correspond to the minimum value Δγarm among the integrated values of the yaw rate deviation index values.

In step 150, a standard value Tpr0 which is used to set five reference values Tprn in step 60 in the next cycle is renewed to the time constant coefficient Tpr (=Tprm) of steering response for clockwise turning estimated in step 140 and is stored in the buffer memory.

In step 160, a reference value spacing ΔTpr is renewed to a larger one of Ka*(present reference value spacing ΔTpr) and the guard minimum value ΔTpmin, and is stored in the buffer memory.

If a positive decision is made in step 170, in step 180, the estimated value of time constant coefficient Tpr of steering response for clockwise turning is stored in the EEPROM so as to renew the estimated value of time constant coefficient Tpr of steering response for clockwise turning stored in the EEPROM.

In steps 65-185, the control procedures same as in steps 60-180 are executed for counter-clockwise turning of the vehicle by displacing "r" indicating clockwise turning with "l" indicating counter-clockwise turning.

Turning characteristic for clockwise turning and turning characteristic for counter-clockwise turning may be different from each other. For example, in the case where gravity center is not at the center in lateral direction of the vehicle due to the distribution situation of passengers or load, or gravity center moves so much in lateral direction of the vehicle due to getting on and off of passengers or loading and unloading of goods, turning characteristic differs according to turning direction of the vehicle.

According to the fifth embodiment, it is possible not only to achieve the same operation and effect as in the first embodiment, but also, for the reason that a time constant coefficient of steering response is estimated for each turning direction, to estimate time constant coefficients Tpr and Tpl of steering response for both clockwise turning and counter-clockwise turning with high reliability even when turning characteristic differs according to turning direction of the vehicle.

Sixth Embodiment

Figure 10:
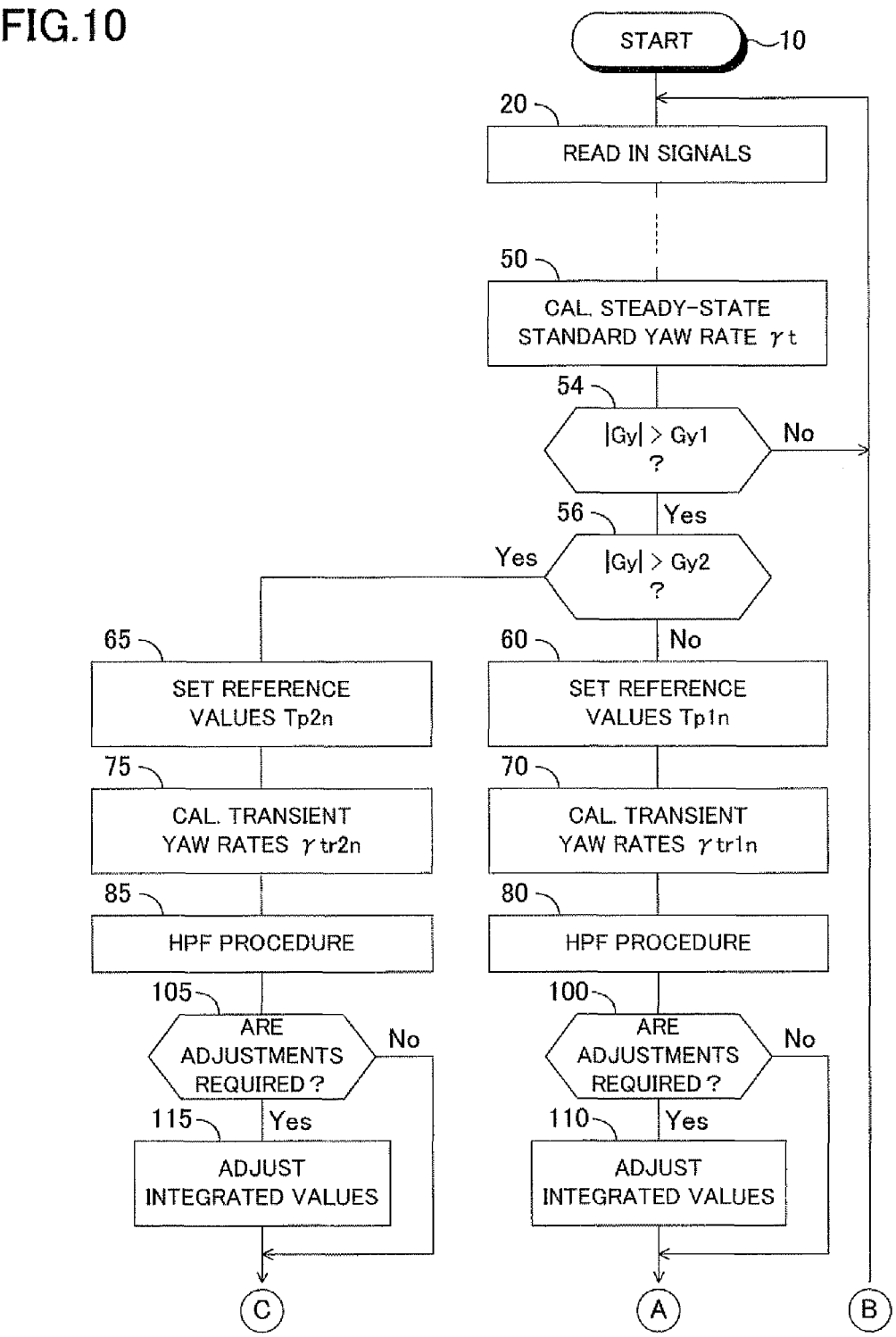
FIG. 10 is a flowchart showing former half portion of a routine for calculating a time constant coefficient Tp of steering response by estimation in a sixth embodiment of the turning characteristic estimation device according to the present invention which is configured as a modification of the first embodiment.
Figure 11:
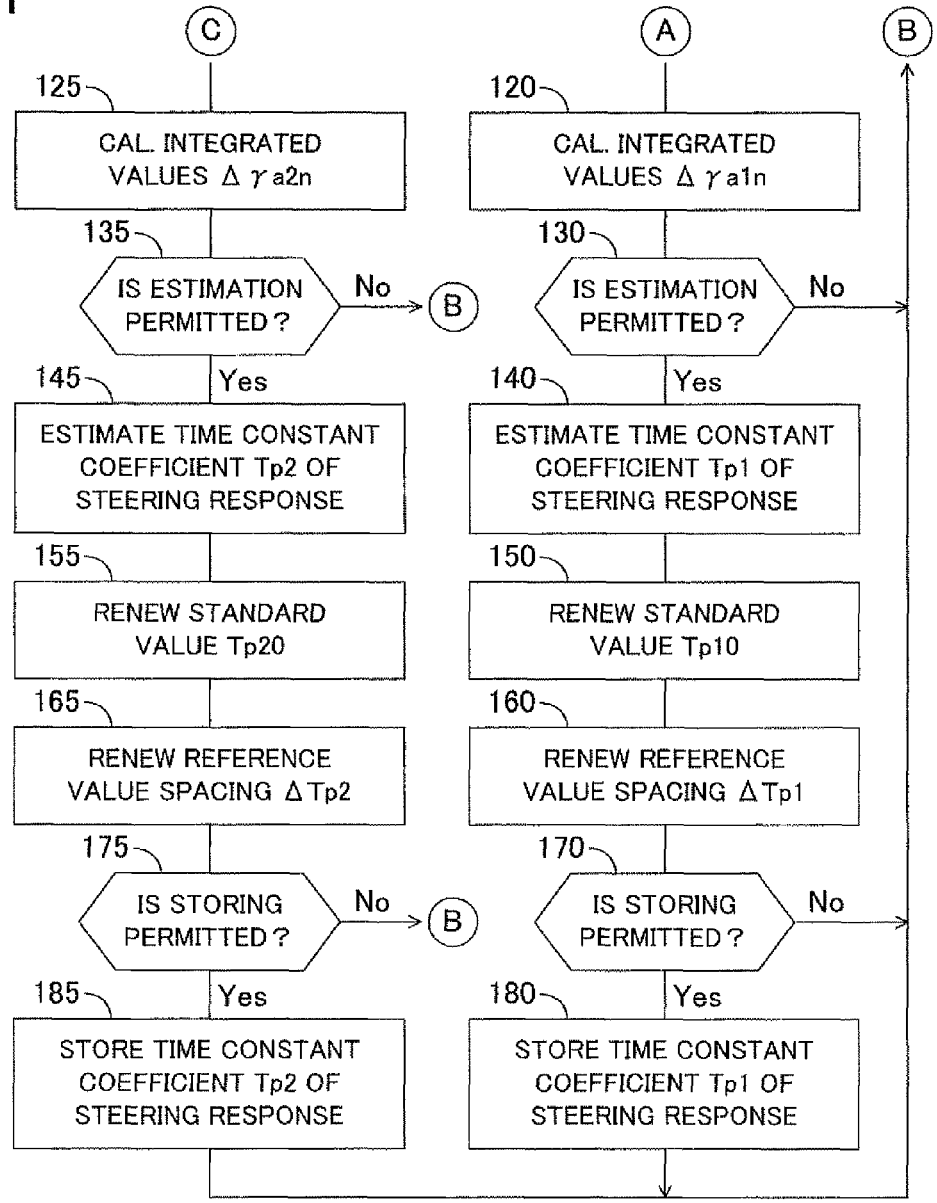
FIG. 11 is a flowchart showing former the latter half portion of a routine for calculating a time constant coefficient Tp of steering response by estimation in a sixth embodiment of the turning characteristic estimation device according to the present invention which is configured as a modification of the first embodiment.

FIGS. 10 and 11 are flowcharts showing former half and the latter half, respectively, of a routine for calculating a time constant coefficient Tp of steering response by estimation in a sixth embodiment of the turning characteristic estimation device according to the present invention which is configured as a modification of the first embodiment.

In this sixth embodiment, after completion of step 50, in step 54, a decision is made as to whether or not the absolute value of lateral acceleration Gy of the vehicle is larger than a first reference value Gy1 (a positive constant). If a negative decision is made, the control returns to step 20. If a positive decision is made, the control proceeds to step 56.

In step 56, a decision is made as to whether or not the absolute value of lateral acceleration Gy of the vehicle is larger than a second reference value Gy2 (a positive constant larger than the first reference value Gy1). If a negative decision is made, in steps 60-180, the control procedures same as in steps 60-180 in the first embodiment are executed for the case where the absolute value of lateral acceleration Gy of the vehicle is larger than the first reference value Gy1 and smaller than the second reference value Gy2 (a first area of lateral acceleration Gy). To the contrary, if a positive decision is made, in steps 65-185, the control procedures same as in steps 60-180 in the first embodiment are executed for the case where the absolute value of lateral acceleration Gy of the vehicle is larger than the second reference value Gy2 (a second area of lateral acceleration Gy).

That is, in step 60, five reference values Tp1n (n=1-5) are set for the first area of lateral acceleration Gy and in step 70, five transient yaw rates γtr1n (n=1-5) are calculated for the five reference values Tp1n.

In step 80, high-pass filtering procedures are conducted on the actual yaw rate γ and the transient yaw rates γtr1n. In step 100, a decision is made as to whether or not adjustments are to be executed on integrated values Δγa1n (n=1-5) of the yaw rate deviation index values calculated in step 120. If a positive decision is made, integrated values Δγa1n of the yaw rate deviation index values are cleared to 0 in step 110. If a negative decision is made, the control proceeds to step 120.

In step 120, integrated values Δγa1n (n=1-5) of the yaw rate deviation index values are calculated for the first area of lateral acceleration Gy. In step 140, the minimum value Δγa1m among the five integrated values Δγa11-Δγa15 of the yaw rate deviation index values is decided (m is any one of 1-5). An estimated value of time constant coefficient Tpr of steering response for the first area of lateral acceleration Gy is set to a time constant coefficient Tp1m of steering response which correspond to the minimum value Δγa1m among the integrated values of the yaw rate deviation index values.

In step 150, a reference value Tpr0 which is used to set five reference values Tp1n in step 60 in the next cycle is renewed to the time constant coefficient Tp1 (=Tp1m) of steering response estimated in step 140 and is stored in the buffer memory.

In step 160, a reference value spacing ΔTp1 is renewed to a larger one of Ka*(present reference value spacing ΔTp1) and the guard minimum value ΔTpmin, and is stored in the buffer memory.

If a positive decision is made in step 170, in step 180, the estimated value of time constant coefficient Tp1 of steering response is stored in the EEPROM so as to renew the estimated value of time constant coefficient Tp1 of steering response for the first area of lateral acceleration Gy stored in the EEPROM.

In steps 65-185, the control procedures same as in steps 60-180 are executed for the second area of lateral acceleration Gy by displacing "1" indicating the first area of lateral acceleration Gy with "2" indicating the second area of lateral acceleration Gy.

In general, turning characteristic may change according to the magnitude of lateral acceleration Gy. According to the sixth embodiment, it is possible not only to achieve the same operation and effect as in the first embodiment, but also, for the reason that a time constant coefficient of steering response is estimated for each area of lateral acceleration Gy, to estimate a time constant coefficient Tp of steering response with high accuracy for each area of lateral acceleration Gy even when lateral acceleration Gy varies so much in magnitude.

Seventh Embodiment

Figure 12:
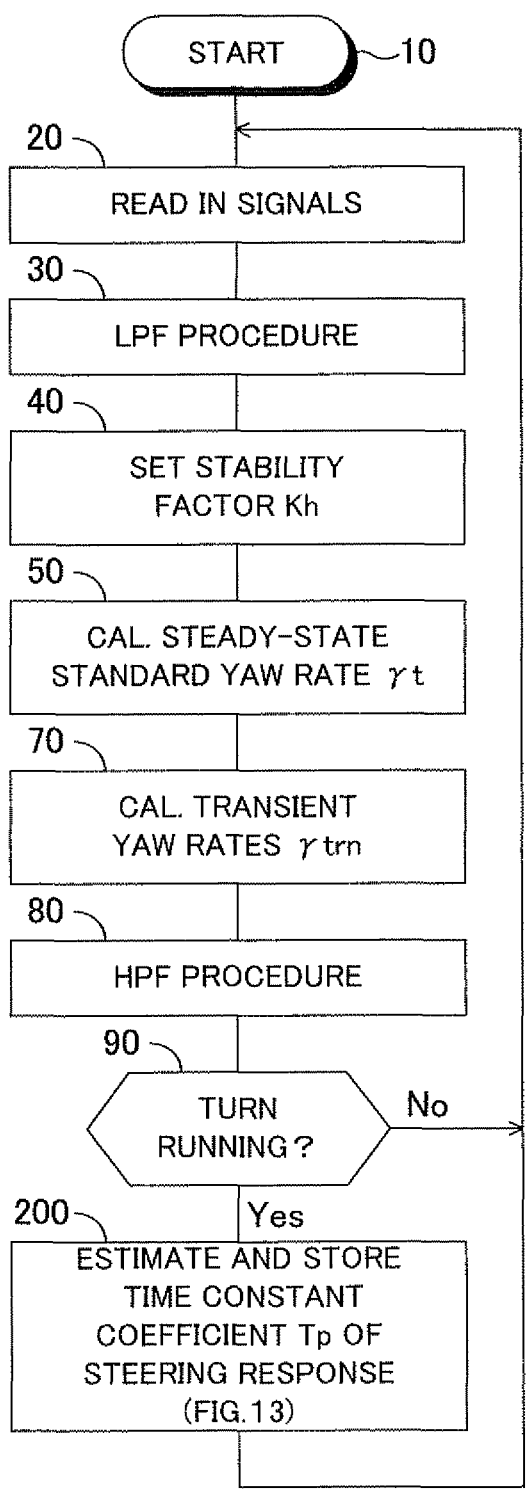
FIG. 12 is a flowchart showing a routine for calculating a time constant coefficient Tp of steering response by estimation in a seventh embodiment of the turning characteristic estimation device according to the present invention.

FIG. 12 is a flowchart showing a routine for calculating a time constant coefficient Tp of steering response by estimation in a seventh embodiment of the turning characteristic estimation device according to the present invention which is adapted to a vehicle motion control device.

In this seventh embodiment, step 60 and steps 100-180 in the first embodiment are not executed. Accordingly, in step 70, a transient yaw rate γtr is calculated in accordance with the under-mentioned equation 22 corresponding to the above-mentioned equation 17. In addition, if a positive decision is made in step 90, the control proceeds to step 200 where a time constant coefficient Tp of steering response is estimated in accordance with a flowchart shown in FIG. 13.

$$\gamma tr = \frac{1}{1 + TpVs}\gamma t \qquad (22)$$

Figure 13:
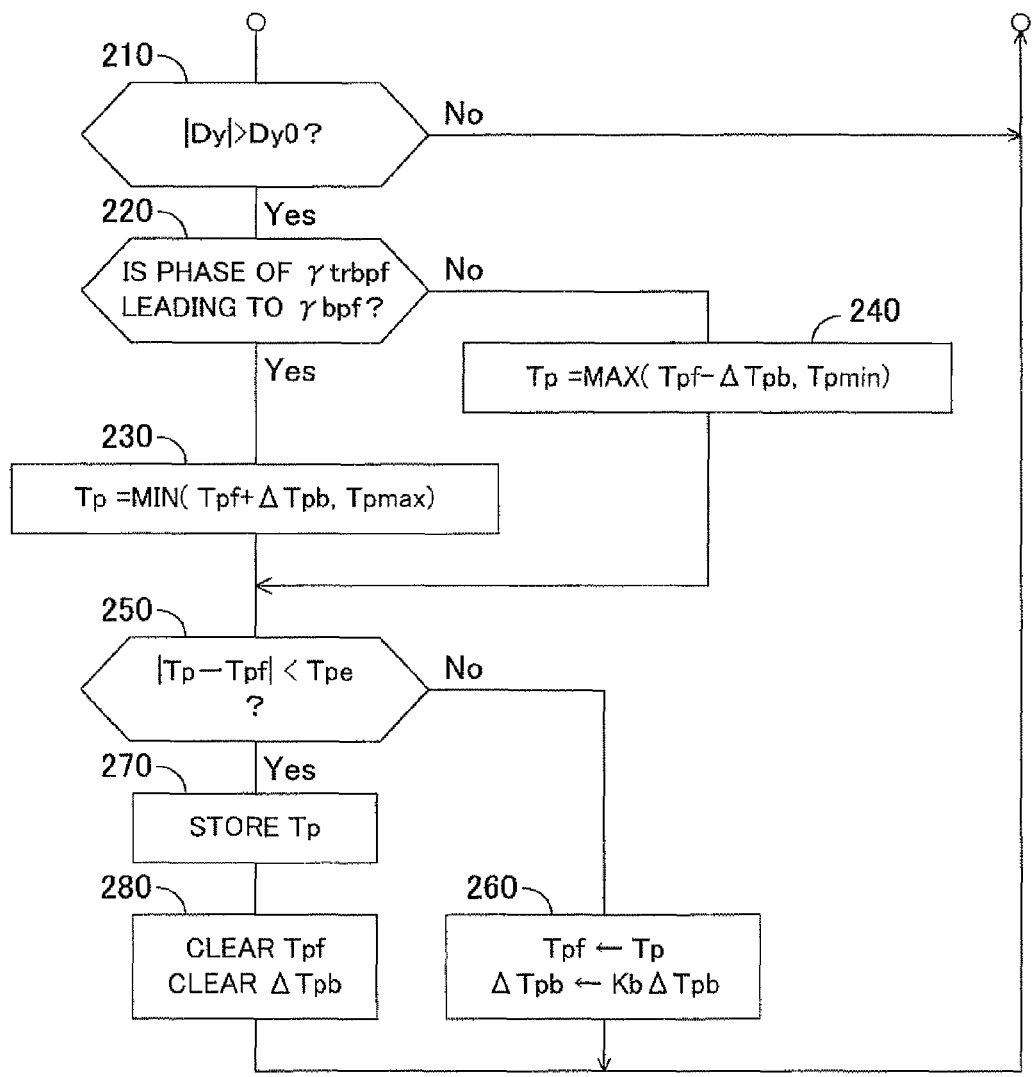
FIG. 13 is a flowchart showing a subroutine for estimating and storing a time constant coefficient Tp of steering response in step 200 shown in FIG. 12.

As shown in FIG. 13, in step 210, a decision is made as to whether or not the absolute value of phase difference Dy between band-pass filtered transient yaw rate γtrbpf and band-pass filtered actual yaw rate γbpf is larger than a reference value Dy0 (a positive constant). If a negative decision is made, the control returns to step 20 because increasing or decreasing adjustment of the estimated value of a time constant coefficient Tp of steering response is not necessary. If a positive decision is made, the control proceeds to step 220.

In step 220, a decision is made as to whether or not the phase of the transient yaw rate γtrbpf is leading to that of the actual yaw rate γbpf. If a negative decision is made, the control proceeds to step 240, while if a positive decision is made, the control proceeds to step 230.

In step 230, estimated value of a time constant coefficient Tp of steering response is set to a smaller one of a sum Tpf+ΔTpb and a preliminarily set maximum value Tpmax of time constant coefficient of steering response, the sum Tpf+ΔTpb being the previous cycle estimated value Tpf of a time constant coefficient Tp of steering response plus an increasing or decreasing adjustment value ΔTpb set in step 260 in previous cycle.

In step 240, estimated value of a time constant coefficient Tp of steering response is set to a larger one of a value Tpf−ΔTpb and a preliminarily set minimum value Tpmin of time constant coefficient of steering response (a positive constant smaller than Tpmax), the value Tpf−ΔTpb being the previous cycle estimated value Tpf of a time constant coefficient Tp of steering response subtracted by the increasing or decreasing adjustment value ΔTpb.

In step 250, a decision is made as to whether or not an absolute value of the difference between the present cycle time constant coefficient Tp of steering response and the previous cycle time constant coefficient Tpf is smaller than a reference value Tpe (a positive constant) for storing decision. If a positive decision is made, the control proceeds to step 270, while if a negative decision is made, the control proceeds to step 260.

In step 260, "previous cycle estimated value Tpf" for the control of the next cycle is rewritten to the estimated value of a time constant coefficient Tp of steering response and with Kb being a coefficient larger than 0 and smaller than 1 such as 0.5 for example, the increasing or decreasing adjustment value ΔTpb is rewritten to a product of the coefficient Kb and the present increasing or decreasing adjustment value ΔTpb.

In step 270, the estimated value of time constant coefficient Tp of steering response is stored in the EEPROM. In step 280, the previous cycle estimated value Tpf is cleared to 0 and the increasing or decreasing adjustment value ΔTpb is as well cleared to 0.

Thus, according to the seventh embodiment, when the phase of the transient yaw rates γtrbpf is leading to that of the actual yaw rate γbpf, a positive decision is made in step 220, and estimated value of a time constant coefficient Tp of steering response is increasingly adjusted in step 230. In contrast, when the phase of the transient yaw rates γtrbpf is behind that of the actual yaw rate γbpf, a negative decision is made in step 220, and estimated value of a time constant coefficient Tp of steering response is decreasingly adjusted in step 240.

Therefore, according to the seventh embodiment, it is possible to adjust estimated value of a time constant coefficient Tp of steering response so that the phase difference between transient yaw rate γtr and actual yaw rate γ decreases to approximate estimated value of a time constant coefficient Tp of steering response to a real time constant coefficient of steering response. Accordingly, it is possible to estimate a time constant coefficient Tp of steering response to be a value close to a real time constant coefficient of steering response.

According to the seventh embodiment, in step 50, a steady-state standard yaw rate γt is calculated on the basis of steering angle θ, etc. which are low-pass filtered in step 30. In step 80, high-pass filtering procedures are conducted on the actual yaw rate γ and the transient yaw rates γtrn calculated in step 70 on the basis of the steady-state standard yaw rate γt.

Therefore, as in the above-described first to sixth embodiments, it is possible to remove high frequency noise included in signals indicating detected steering angle θ, etc. and as well to remove influences due to zero point offset in the sensors. Accordingly, a time constant coefficient Tp of steering response can more accurately be estimated as compared with a case where no high-pass filtering procedure is conducted on the actual yaw rate γ and the transient yaw rates γtrn.

According to the seventh embodiment, in step 90, a decision is made as to whether or not the vehicle is under the turn running condition and if a positive decision is made, the control procedures of step 200 and the following steps are executed. Therefore, as in the above-described first to sixth embodiments, it is possible to prevent step 200 and the following steps from being unnecessarily conducted and time constant coefficient Tp of steering response from being inaccurately estimated under a situation where the vehicle is not turning and accordingly accurate estimation of time constant coefficient Tp of steering response is impossible.

According to the seventh embodiment, in particular, when a magnitude of the difference between the present cycle time constant coefficient Tp of steering response and the previous cycle time constant coefficient Tpf is not smaller than a reference value Tpe for storing decision, a negative decision is made in step 250. In step 260, the increasing or decreasing adjustment value ΔTpb is reduced by rewriting it to a product of the coefficient Kb and the present increasing or decreasing adjustment value ΔTpb.

Therefore, it is possible more efficiently to reduce the phase difference between transient yaw rate γtr and actual yaw rate γ as compared with the case where the increasing or decreasing adjustment value ΔTpb is not reduced so that a estimated value of time constant coefficient Tp of steering response can more efficiently be approximated to a real value.

According to the seventh embodiment, when a magnitude of the difference between the present cycle time constant coefficient Tp of steering response and the previous cycle time constant coefficient Tpf becomes smaller than a reference value Tpe for storing decision, a positive decision is made in step 250. In step 270, the estimated value of time constant coefficient Tp of steering response is stored in the EEPROM.

Therefore, as compared with the case where step 250 is not conducted, it is possible more effectively to prevent the estimated value of time constant coefficient Tp of steering response from being stored in the EEPROM at a stage when a estimated value of time constant coefficient Tp of steering response has not yet been approximated to a real value of time constant coefficient of steering response and to reduce the frequency of estimation and renewal of time constant coefficient Tp of steering response.

Further, according to the seventh embodiment, when the absolute value of phase difference Dy between band-pass filtered transient yaw rates γtrbpf and band-pass filtered actual yaw rate γbpf is smaller than the reference value Dy0, a negative decision is made in step 210 and step 220 and the following steps are not conducted.

Therefore, it is possible to prevent estimation and renewal of time constant coefficient Tp of steering response from being unnecessarily repeated under the situation where an estimated value of time constant coefficient Tp of steering response is approximate to a real value of time constant coefficient of steering response.

Eighth Embodiment

Figure 14:
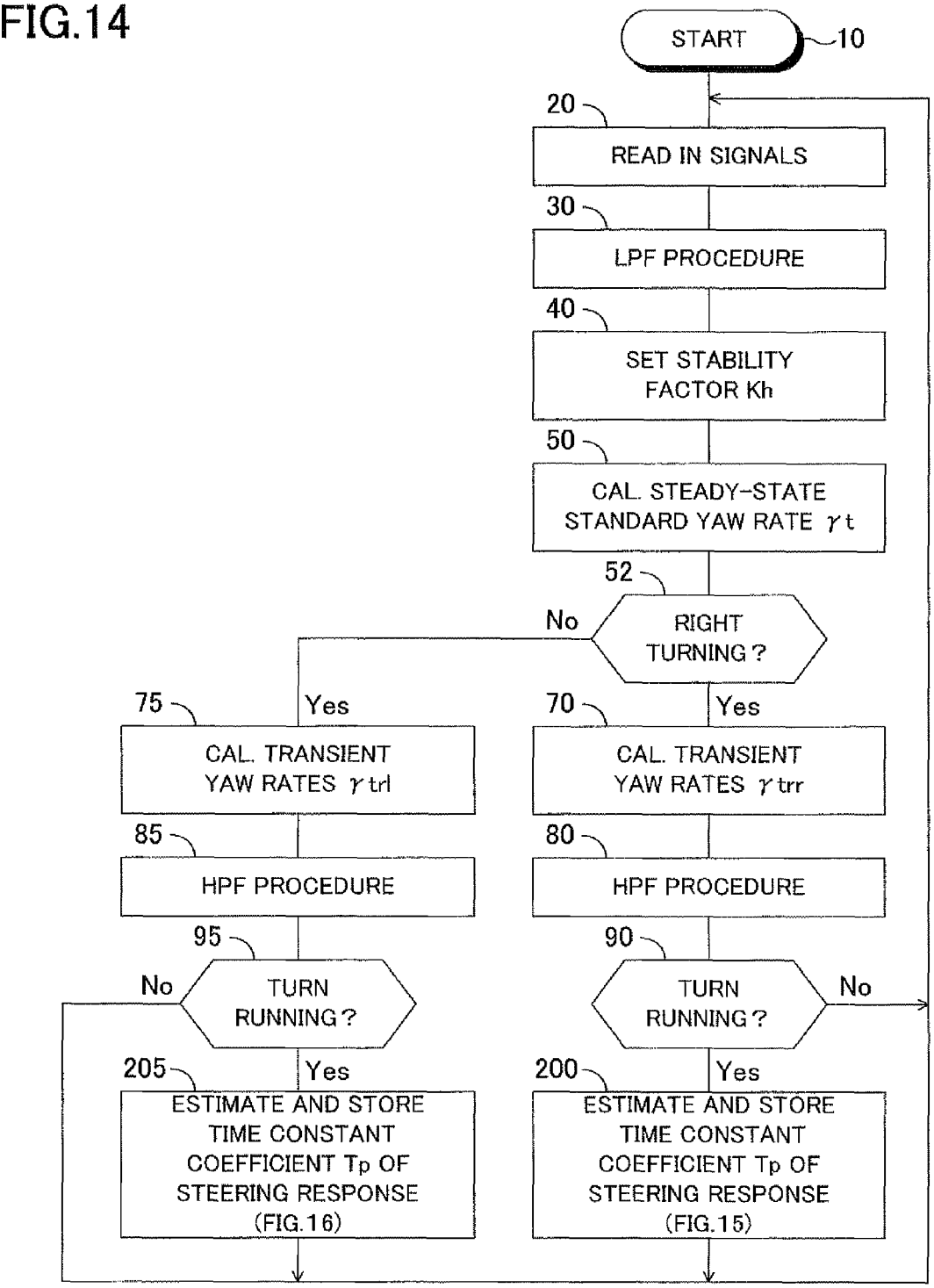
FIG. 14 is a flowchart showing a routine for calculating a time constant coefficient Tp of steering response by estimation in an eighth embodiment of the turning characteristic estimation device according to the present invention.

FIG. 14 is a flowchart showing a routine for calculating a time constant coefficient Tp of steering response by estimation in an eighth embodiment of the turning characteristic estimation device according to the present invention which is configured as a modification of the seventh embodiment.

In this eighth embodiment, after completion of step 50, step 52 is conducted as in the above-described fifth embodiment. If a positive decision is made in step 52, the control proceeds to step 70, while if a negative decision is made, the control proceeds to step 75.

In step 70, a transient yaw rate γtrr for clockwise turning is calculated on the basis of a time constant coefficient Tpr of steering response for clockwise turning described below in accordance with the under-mentioned equation 23 corresponding to the above-mentioned equation 17.

$$\gamma trr = \frac{1}{1 + TprVs}\gamma t \quad (23)$$

In step 80, high-pass filtering procedures are conducted on the actual yaw rate γ and the transient yaw rate γtrr to calculate high-pass filtered actual yaw rate γbpf and high-pass filtered the transient yaw rate γtrrbpf.

If a positive decision is made in step 90, the control proceeds to step 200. A time constant coefficient Tpr of steering response for clockwise turning is estimated in accordance with a flowchart shown in FIG. 15 and the estimated value of time constant coefficient Tpr of steering response is stored in the EEPROM.

Similarly, in step 75, a transient yaw rate γtrl for counter-clockwise turning is calculated on the basis of a time constant coefficient Tpl of steering response for counter-clockwise turning described below in accordance with the under-mentioned equation 24 corresponding to the above-mentioned equation 17.

$$\gamma trl = \frac{1}{1 + TplVs}\gamma t \quad (24)$$

In step 85, high-pass filtering procedures are conducted on the actual yaw rate γ and the transient yaw rate γtrl to calculate high-pass filtered actual yaw rate γbpf and high-pass filtered the transient yaw rate γtrlbpf.

Figure 16:
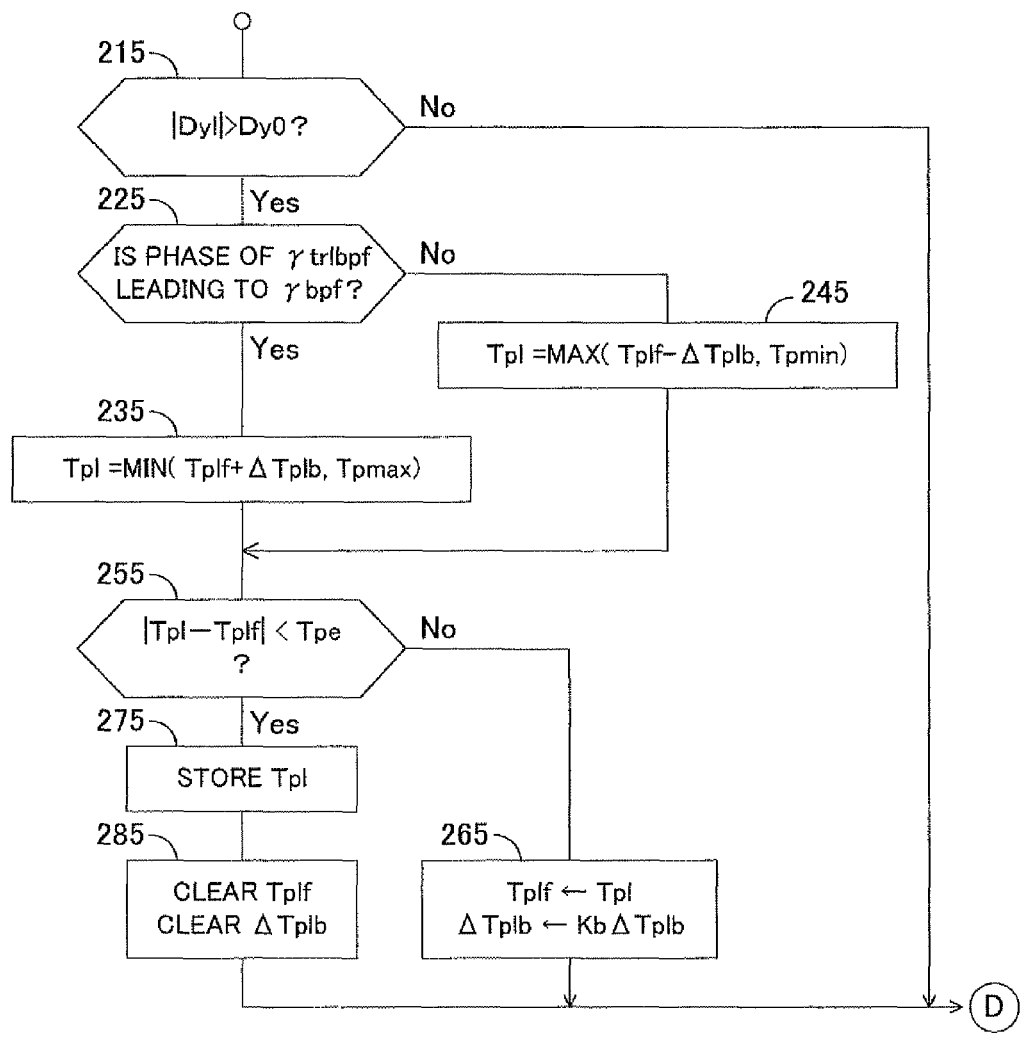
FIG. 16 is a flowchart showing a subroutine for estimating and storing a time constant coefficient Tp of steering response in step 205 shown in FIG. 14.

Step 95 is conducted in the same manner as step 90. If a positive decision is made in step 95, the control proceeds to step 205. A time constant coefficient Tpl of steering response for counter-clockwise turning is estimated in accordance with a flowchart shown in FIG. 16 and the estimated value of time constant coefficient Tpl of steering response is stored in the EEPROM.

Figure 15:
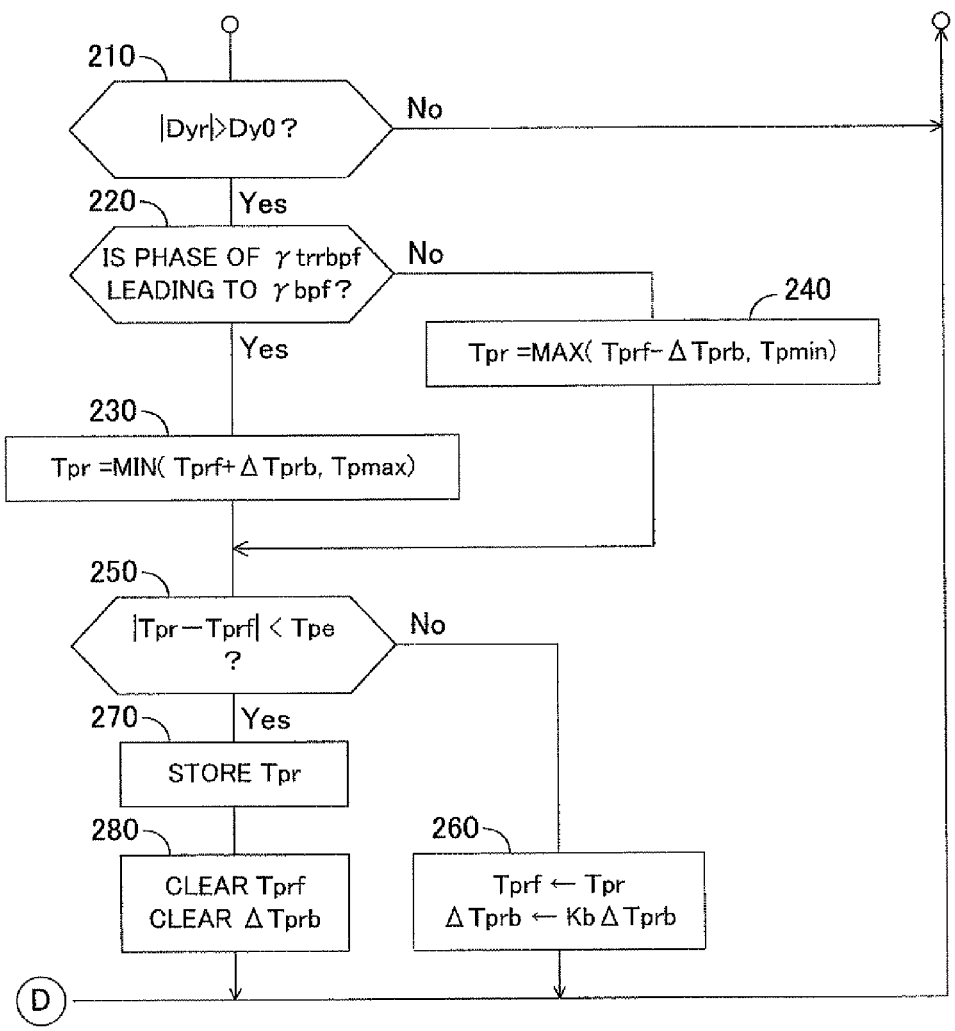
FIG. 15 is a flowchart showing a subroutine for estimating and storing a time constant coefficient Tp of steering response in step 200 shown in FIG. 14.

As shown in FIG. 15, in step 210, a decision is made as to whether or not the absolute value of phase difference Dyr between band-pass filtered transient yaw rate γtrrbpf for clockwise turning and band-pass filtered actual yaw rate γbpf is larger than the reference value Dy0. If a negative decision is made, the control returns to step 20 because increasing or decreasing adjustment of the estimated value of a time constant coefficient Tpr of steering response is not necessary. If a positive decision is made, the control proceeds to step 220.

In step 220, a decision is made as to whether or not the phase of the transient yaw rate γtrbpf is leading to that of the actual yaw rate γbpf. If a negative decision is made, the control proceeds to step 240, while if a positive decision is made, the control proceeds to step 230.

In step 230, estimated value of a time constant coefficient Tpr of steering response for clockwise turning is set to a smaller one of a sum Tprf+ΔTprb and the preliminarily set maximum value Tpmax of time constant coefficient of steering response, the sum Tprf+ΔTprb being the previous cycle estimated value Tprf of a time constant coefficient Tpr of steering response for clockwise turning plus an increasing or decreasing adjustment value ΔTprb for clockwise turning set in step 260 in previous cycle.

In step 240, estimated value of a time constant coefficient Tpr of steering response for clockwise turning is set to a larger one of a value Tprf−ΔTprb and the preliminarily set minimum value Tpmin of time constant coefficient of steering response, the value Tprf−ΔTprb being the previous cycle estimated value Tprf of a time constant coefficient Tp of steering response for clockwise turning subtracted by the increasing or decreasing adjustment value ΔTprb.

In step 250, a decision is made as to whether or not an absolute value of the difference between the present cycle time constant coefficient Tpr of steering response and the previous cycle time constant coefficient Tpf is smaller than the reference value Tpe for storing decision. If a positive decision is made, the control proceeds to step 270, while if a negative decision is made, the control proceeds to step 260.

In step 260, "previous cycle estimated value Tprf" for the control of the next cycle is rewritten to the estimated value of a time constant coefficient Tpr of steering response and the increasing or decreasing adjustment value ΔTprb is rewritten to a product of the coefficient Kb and the present increasing or decreasing adjustment value ΔTprb.

In step 270, the estimated value of time constant coefficient Tpr of steering response is stored in the EEPROM. In step 280, the previous cycle estimated value Tprf is cleared to 0 and the increasing or decreasing adjustment value ΔTprb is as well cleared to 0.

In steps 215-285, the control procedures same as in steps 210-280 are executed for counter-clockwise turning of the vehicle by displacing "r" indicating clockwise turning with "l" indicating counter-clockwise turning.

Thus, according to the eighth embodiment, it is possible not only to achieve the same operation and effect as in the seventh embodiment, but also to estimate time constant coefficients Tpr and Tpl of steering response for both clockwise turning and counter-clockwise turning with high reliability even when turning characteristic differs according to turning direction of the vehicle.

Ninth Embodiment

Figure 17:
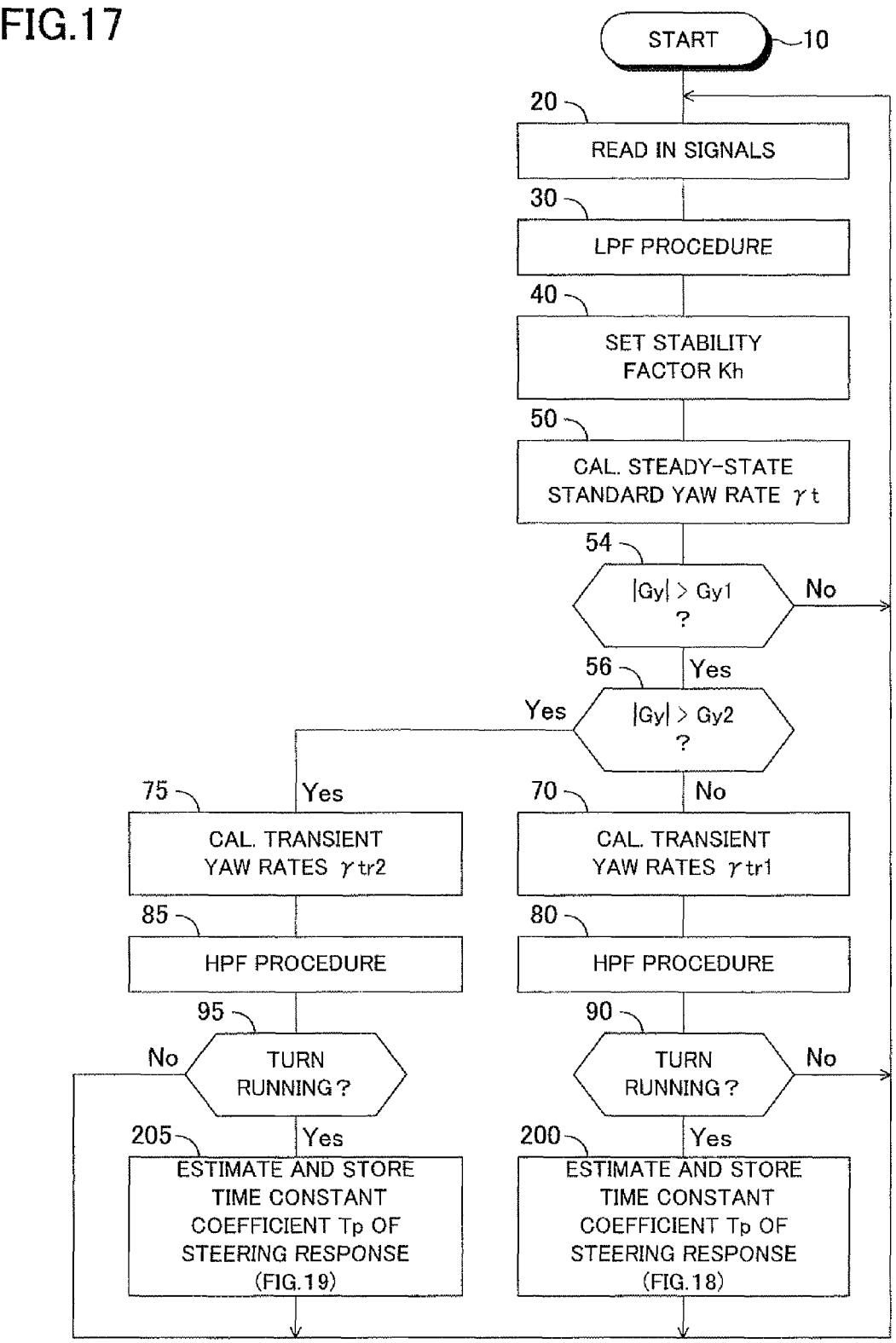
FIG. 17 is a flowchart showing a routine for calculating a time constant coefficient Tp of steering response by estimation in a ninth embodiment of the turning characteristic estimation device according to the present invention.

FIG. 17 is a flowchart showing a routine for calculating a time constant coefficient Tp of steering response by estimation in a ninth embodiment of the turning characteristic estimation device according to the present invention which is configured as a modification of the seventh embodiment.

In this ninth embodiment, after completion of step 50, steps 54 and 56 are conducted as in the above-described sixth embodiment. If a negative decision is made in step 56, the control proceeds to step 70, while if a positive decision is made, the control proceeds to step 75.

In step 70, a transient yaw rate γtr1 for the first area of lateral acceleration Gy is calculated in accordance with the under-mentioned equation 25 corresponding to the above-mentioned equation 17.

$$\gamma tr1 = \frac{1}{1 + Tp1Vs}\gamma t \qquad (25)$$

In step 80, high-pass filtering procedures are conducted on the actual yaw rate γ and the transient yaw rates γtr1 to calculate high-pass filtered actual yaw rate γbpf and high-pass filtered the transient yaw rate γtr1bpf.

If a positive decision is made in step 90, the control proceeds to step 200. A time constant coefficient Tp1 of steering response for the first area of lateral acceleration Gy is estimated in accordance with a flowchart shown in FIG. 18 and the estimated value of time constant coefficient Tp1 of steering response is stored in the EEPROM.

Similarly, in step 75, a transient yaw rate γtr2 for the second area of lateral acceleration Gy is calculated in accordance with the under-mentioned equation 26 corresponding to the above-mentioned equation 17.

$$\gamma tr2 = \frac{1}{1 + Tp2Vs}\gamma t \qquad (26)$$

In step 85, high-pass filtering procedures are conducted on the actual yaw rate γ and the transient yaw rate γtr2 to calculate high-pass filtered actual yaw rate γbpf and high-pass filtered the transient yaw rate γtr2bpf.

Figure 19:
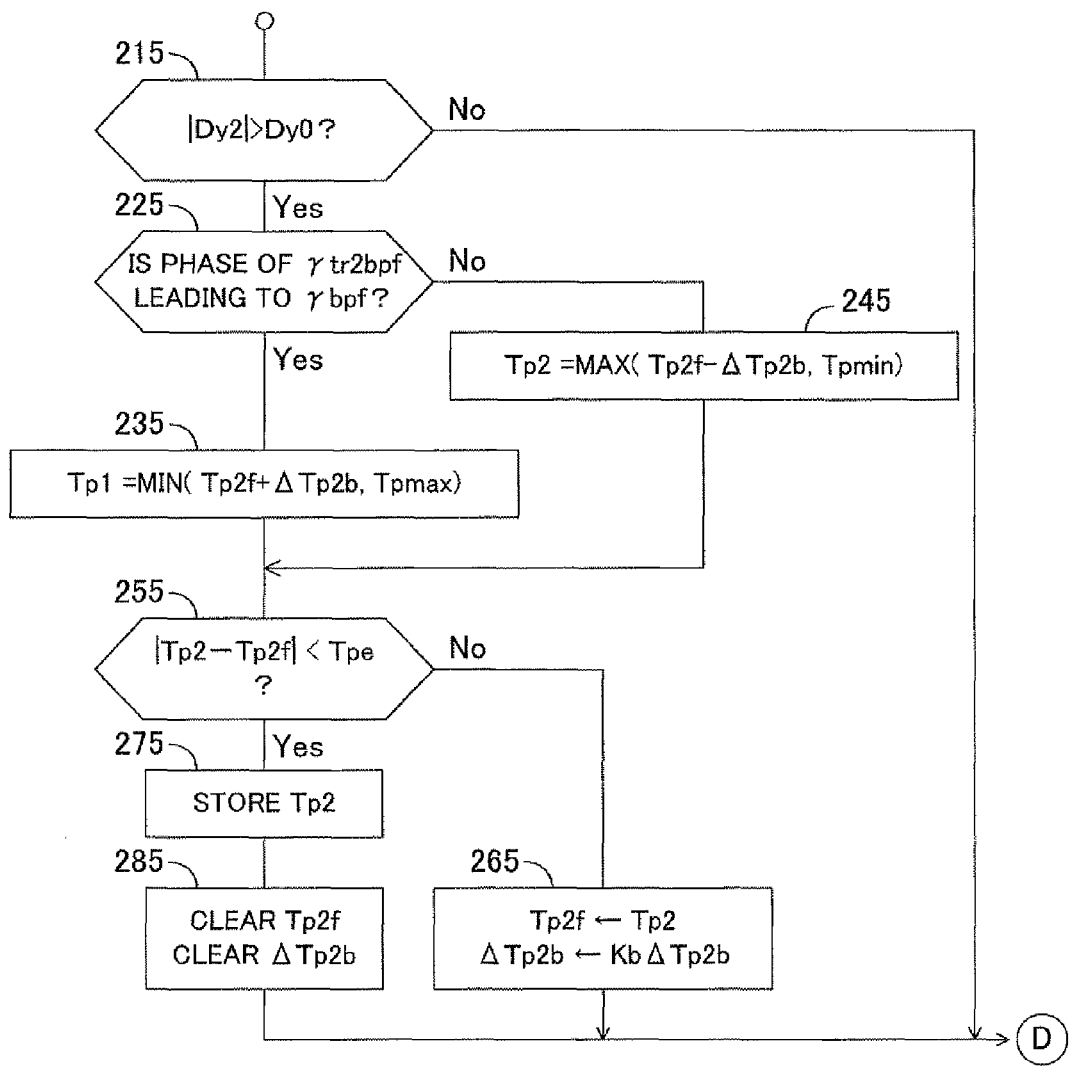
FIG. 19 is a flowchart showing a subroutine for estimating and storing a time constant coefficient Tp of steering response in step 205 shown in FIG. 17.
Figure 20:
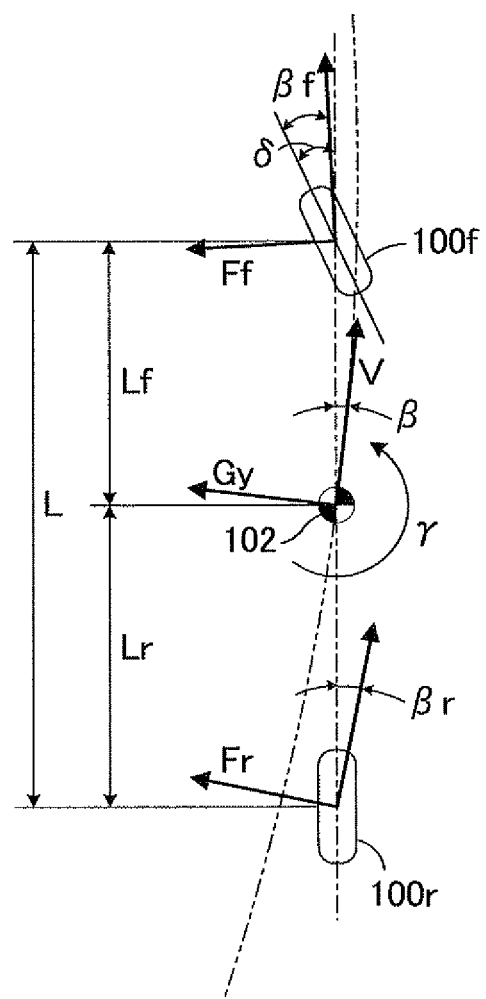
FIG. 20 is an explanatory diagram showing a two wheel model of a vehicle for estimating a time constant coefficient of steering response.

Step 95 is conducted in the same manner as step 90. If a positive decision is made in step 95, the control proceeds to step 205. A time constant coefficient Tp2 of steering response for the second area of lateral acceleration Gy is estimated in accordance with a flowchart shown in FIG. 19 and the estimated value of time constant coefficient Tp2 of steering response is stored in the EEPROM.

Figure 18:
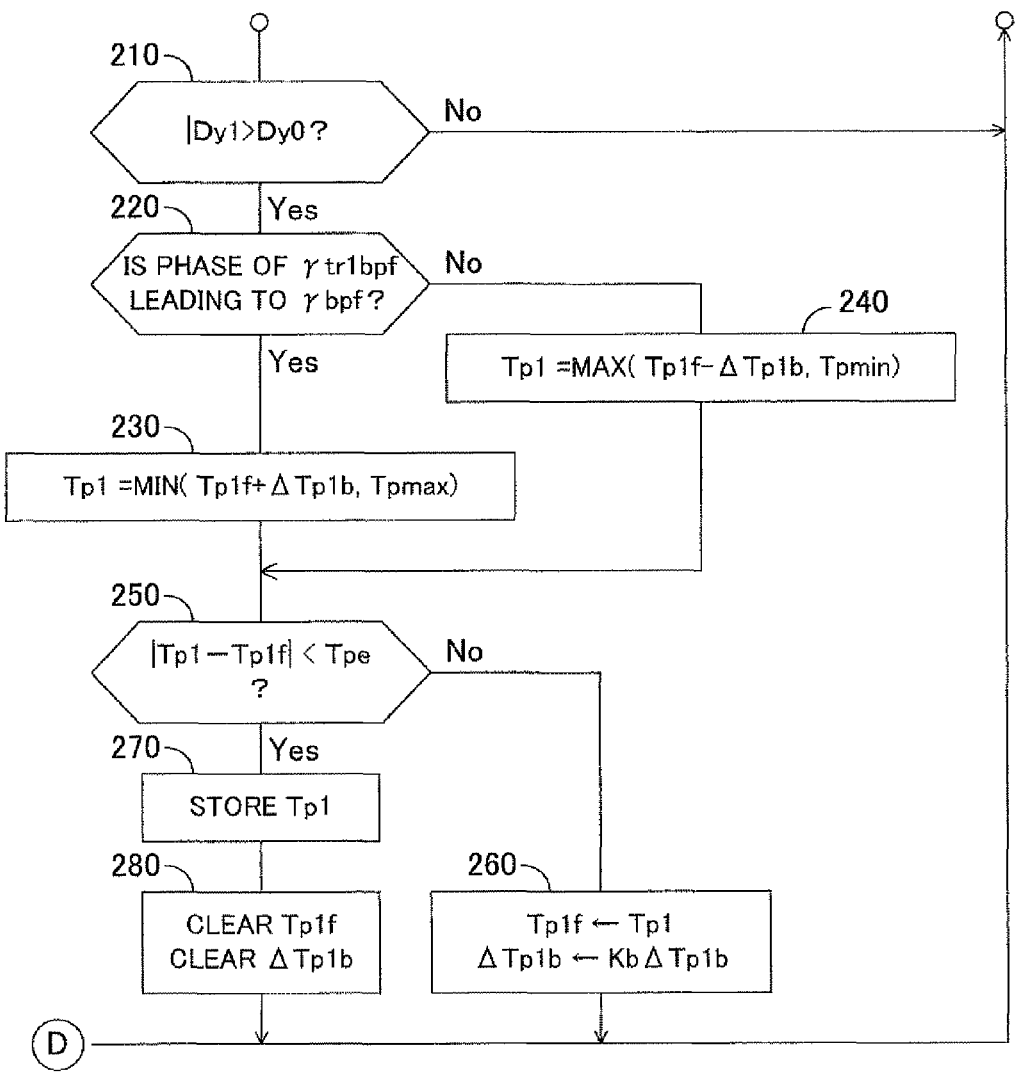
FIG. 18 is a flowchart showing a subroutine for estimating and storing a time constant coefficient Tp of steering response in step 200 shown in FIG. 17.

As shown in FIG. 18, in step 210, a decision is made as to whether or not the absolute value of phase difference Dy1 between band-pass filtered transient yaw rate γtr1bpf for the first area of lateral acceleration Gy and band-pass filtered actual yaw rate γbpf is larger than the reference value Dy0. If a negative decision is made, the control returns to step 20 because increasing or decreasing adjustment of the estimated value of a time constant coefficient Tp1 of steering response is not necessary. If a positive decision is made, the control proceeds to step 220.

In step 220, a decision is made as to whether or not the phase of the transient yaw rate γt1bpf is leading to that of the actual yaw rate γbpf. If a negative decision is made, the control proceeds to step 240, while if a positive decision is made, the control proceeds to step 230.

In step 230, estimated value of a time constant coefficient Tp1 of steering response for the first area of lateral acceleration Gy is set to a smaller one of a sum Tp1f+ΔTp1b and the preliminarily set maximum value Tpmax of time constant coefficient of steering response, the sum Tp1f+ΔTp1b being the previous cycle estimated value Tp1f of a time constant coefficient Tp1 of steering response for the first area of lateral acceleration Gy plus an increasing or decreasing adjustment value ΔTp1b for the first area of lateral acceleration Gy set in step 260 in previous cycle.

In step 240, estimated value of a time constant coefficient Tp1 of steering response for the first area of lateral acceleration Gy is set to a larger one of a value Tp1f+ΔTp1b and the preliminarily set minimum value Tpmin of time constant coefficient of steering response, the value Tp1f−ΔTp1b being the previous cycle estimated value Tp1f of a time constant coefficient Tp1 of steering response for the first area of lateral acceleration Gy subtracted by the increasing or decreasing adjustment value ΔTp1b.

In step 250, a decision is made as to whether or not an absolute value of the difference between the present cycle time constant coefficient Tp1 of steering response and the previous cycle time constant coefficient Tp1f is smaller than the reference value Tpe for storing decision. If a positive decision is made, the control proceeds to step 270, while if a negative decision is made, the control proceeds to step 260.

In step 260, "previous cycle estimated value Tp1f" for the control of the next cycle is rewritten to the estimated value of a time constant coefficient Tp1 of steering response and the increasing or decreasing adjustment value ΔTp1b is rewritten to a product of the coefficient Kb and the present increasing or decreasing adjustment value ΔTp1b.

In step 270, the estimated value of time constant coefficient Tp1 of steering response is stored in the EEPROM. In step 280, the previous cycle estimated value Tp1f is cleared to 0 and the increasing or decreasing adjustment value ΔTp1b is as well cleared to 0.

In steps 215-285, the control procedures same as in steps 210-280 are executed for second area of lateral acceleration Gy by displacing "1" indicating the first area of lateral acceleration Gy with "2" indicating the second area of lateral acceleration Gy.

According to the ninth embodiment, it is possible not only to achieve the same operation and effect as in the seventh embodiment, but also to estimate a time constant coefficient Tp of steering response with high accuracy for each area of lateral acceleration Gy even when lateral acceleration Gy varies so much in magnitude.

While in the above-described seventh to ninth embodiments, transient yaw rate γtr1bpf and the like are calculated in each cycle as in the other embodiments, a steering angle θ and the like read in each cycle may be stored in the buffer memory; transient yaw rate γtr1bpf and the like may be calculated on the basis of steering angle θ and the like of each cycle after the vehicle has finished turning; and the control procedure in step 200 or 250 in the seventh to ninth embodiments may be conducted for those transient yaw rate γtr1bpf and the like.

While the present invention has been described in detail with reference to the above particular embodiments, it will be apparent to those skilled in the art that the present invention is not limited thereto, but may be embodied in various other forms without departing from the scope of the invention.

For example, in the above-described first to sixth embodiments, five reference values Tpn (n=1-5) are set on the basis of a standard value Tp0 of time constant coefficient Tp of steering response and a reference value spacing ΔTp. However, three reference values may be calculated in accordance with the equations 13-15, for example, or seven or more reference values may be calculated.

In the above-described first to sixth embodiments, the reference value spacing ΔTp and the like are gradually reduced, but they may be constant.

In the above-described first to sixth embodiments, if a decision is made that adjustments are to be executed on integrated values Δγan of the yaw rate deviation index values and the like, the integrated values Δγan of the yaw rate deviation index values and the like are cleared to 0. However, the integrated values Δγan of the yaw rate deviation index values and the like may be adjusted to a positive value smaller than the present value such as a positive value near 0.

In the above-described sixth and ninth embodiments, time constant coefficient Tp of steering response is estimated for the first and second areas having different lateral acceleration Gy in magnitude. However, time constant coefficientx Tp of steering response may be estimated for three or more areas having different lateral acceleration Gy in magnitude.

In the above-described seventh to ninth embodiments, the increasing or decreasing adjustment value ΔTpb and the like are gradually reduced, but they may be constant.

While the above-described fifth and sixth embodiments are configured as a modification of the first embodiment, the configuration of the fifth or sixth embodiment may be adapted to any one of the second to forth embodiments. Similarly, the above-described seventh embodiment is configured as a modification of the first embodiment, the configuration of the seventh embodiment may be adapted to any one of the second to forth embodiments.

The invention claimed is:

1. A turning characteristic estimation method for a vehicle, comprising:
   obtaining an actual yaw rate of the vehicle;
   obtaining a vehicle speed of the vehicle;
   obtaining a steered angle of front wheels of the vehicle;
   obtaining a lateral acceleration of the vehicle;
   calculating a steady-state basic yaw rate based on the obtained vehicle speed, the obtained steered angle and the obtained lateral acceleration;
   calculating a plurality of transient yaw rates based on the calculated basic yaw rate using a steering response equation in which the transient yaw rate is expressed as having a first order delay relative to the basic yaw rate,
   wherein the steering response equation comprises a time constant of the first order delay, and
   wherein each of the plurality of transient yaw rates is calculated based on a corresponding different reference value of a time constant coefficient which is a coefficient multiplied to the vehicle speed in the time constant of the first order delay;
   calculating respective differences between each of the plurality of transient yaw rates and the obtained actual yaw rate;
   selecting a reference value among the plurality of reference values corresponding to the transient yaw rate having a minimum difference to the actual yaw rate as an estimated time constant coefficient of the steering response, which represents the turning characteristic of the vehicle; and
   updating each reference value based on the estimated time constant coefficient;
   wherein the turning characteristic estimation of the vehicle is performed by an electronic control unit.

2. The turning characteristic estimation method for a vehicle according to claim 1, wherein the estimated value of the time constant coefficient of the steering response is adjusted so that the transient yaw rate of the vehicle approaches the actual yaw rate of the vehicle by means of reducing at least one of a difference in magnitude between the transient yaw rate of the vehicle and the actual yaw rate of the vehicle and a difference in phase between a transient yaw rate of the vehicle and an actual yaw rate of the vehicle.

3. The turning characteristic estimation method for a vehicle according to claim 2, wherein three transient yaw rates of the vehicle are calculated using a first reference value which is a stored time constant coefficient of steering response, a second reference value which is larger than the first reference value and a third reference value which is smaller than the first reference value, and the reference value among the three reference values is selected, the reference value corresponding to a minimum value among yaw rate deviation index values which index differences in magnitude between transient yaw rates of the vehicle and an actual yaw rate of the vehicle to set the selected reference value to an estimated time constant coefficient of steering response.

4. The turning characteristic estimation method for a vehicle according to claim 3, wherein the estimated time constant coefficient of steering response is set to a renewed first reference value; three transient yaw rates of the vehicle using the renewed first reference value, a renewed second reference value which is larger than the renewed first reference value and a renewed third reference value which is smaller than the renewed first reference value are calculated; and the reference value among the three renewed reference values is selected, the reference value corresponding to a minimum value among yaw rate deviation index values to set the selected reference value to a renewed estimated time constant coefficient of steering response.

5. The turning characteristic estimation method for a vehicle according to claim 4, wherein the difference between the renewed second reference value and the renewed first reference value is smaller than the difference between the second reference value and the first reference value, and the difference between the renewed third reference value and the renewed first reference value is smaller than the difference between the third reference value and the first reference value.

6. The turning characteristic estimation method for a vehicle according to claim 3, wherein the yaw rate deviation index values are calculated on the basis of the magnitude of the difference between an actual yaw rate removed of components equal to or lower than a first prescribed frequency and a transient yaw rates removed of components equal to or lower than a second prescribed frequency.

7. The turning characteristic estimation method for a vehicle according to claim 6, wherein the first prescribed frequency and/or the second prescribed frequency is/are varied according to an index value of the number of reciprocating steering operations by a driver per unit time.

8. The turning characteristic estimation method for a vehicle according to claim 6, wherein the first prescribed frequency and/or the second prescribed frequency according to a magnitude of lateral acceleration of the vehicle.

9. The turning characteristic estimation method for a vehicle according to claim 3, wherein the yaw rate deviation index values are calculated as values in which the magnitude of the differences between transient yaw rates and an actual yaw rate is transferred to the magnitude of steered angle deviations of the front wheels.

10. The turning characteristic estimation method for a vehicle according to claim 2, wherein the estimated value of the time constant coefficient of the steering response is increasingly adjusted when the phase of the transient yaw rates is leading to that of the actual yaw rate, but the estimated value of the time constant coefficient of the steering response is decreasingly adjusted when the phase of the transient yaw rates is behind that of the actual yaw rate.

11. The turning characteristic estimation method for a vehicle according to claim 1, wherein the time constant coefficient of the steering response is estimated individually for clockwise turning and counter-clockwise turning.

12. The turning characteristic estimation method for a vehicle according to claim 1, wherein the time constant coefficient of the steering response is estimated individually for each area of lateral acceleration of the vehicle.

* * * * *